(12) United States Patent
Jin et al.

(10) Patent No.: US 11,762,769 B2
(45) Date of Patent: Sep. 19, 2023

(54) MEMORY CONTROLLER BASED ON FLUSH OPERATION AND METHOD OF OPERATING THE SAME

(71) Applicant: SK hynix Inc., Icheon (KR)

(72) Inventors: Yong Jin, Icheon (KR); Jung Ki Noh, Icheon (KR)

(73) Assignee: SK hynix Inc., Icheon (KR)

( * ) Notice: Subject to any disclaimer, the term of this patent is extended or adjusted under 35 U.S.C. 154(b) by 0 days.

(21) Appl. No.: 17/680,149

(22) Filed: Feb. 24, 2022

(65) Prior Publication Data

US 2022/0179786 A1 Jun. 9, 2022

Related U.S. Application Data

(62) Division of application No. 16/847,555, filed on Apr. 13, 2020, now Pat. No. 11,288,189.

(30) Foreign Application Priority Data

Sep. 20, 2019 (KR) .......................... 10-2019-0116261

(51) Int. Cl.
| | |
|---|---|
| *G06F 12/06* | (2006.01) |
| *G06F 12/0804* | (2016.01) |
| *G06F 1/30* | (2006.01) |
| *G06F 12/10* | (2016.01) |

(52) U.S. Cl.
CPC ............ *G06F 12/0684* (2013.01); *G06F 1/30* (2013.01); *G06F 12/0804* (2013.01); *G06F 12/10* (2013.01)

(58) Field of Classification Search
CPC .... G06F 12/0684; G06F 1/30; G06F 12/0804; G06F 12/10
See application file for complete search history.

(56) References Cited

U.S. PATENT DOCUMENTS

| | | | |
|---|---|---|---|
| 5,734,167 A * | 3/1998 | Skelly ................. | A01M 7/0089 |
| | | | 250/461.1 |
| 9,141,177 B1* | 9/2015 | Nicholls .............. | G11B 19/047 |
| 9,418,699 B1 | 8/2016 | Gibbons et al. | |
| 9,424,864 B2 | 8/2016 | Neppalli et al. | |
| 9,772,782 B2 | 9/2017 | Knowles et al. | |
| 9,875,038 B2 | 1/2018 | Jang et al. | |
| 10,643,707 B2 | 5/2020 | Rajamani et al. | |
| 10,990,526 B1 | 4/2021 | Lam et al. | |

(Continued)

FOREIGN PATENT DOCUMENTS

| | | |
|---|---|---|
| KR | 10-0825802 B1 | 4/2008 |
| KR | 10-2011-0046243 A | 5/2011 |

(Continued)

OTHER PUBLICATIONS

Non-Final Office Action for related U.S. Appl. No. 16/882,076, dated Apr. 5, 2022.

(Continued)

*Primary Examiner* — Sean D Rossiter

(57) ABSTRACT

The present technology includes a memory controller that allocates a new buffer memory area in a buffer memory or stores temporarily stored data in the buffer memory into a memory device based on a state of an auxiliary power device that supplies power to the memory device and the memory controller, and a power state of a host.

17 Claims, 15 Drawing Sheets

(56) References Cited

U.S. PATENT DOCUMENTS

| | | | |
|---|---|---|---|
| 2004/0243826 A1* | 12/2004 | Wang | G06F 21/81 713/193 |
| 2006/0015683 A1 | 1/2006 | Ashmore et al. | |
| 2007/0150645 A1 | 6/2007 | Chandramouli et al. | |
| 2007/0280002 A1 | 12/2007 | Sudhindra Prasad | |
| 2008/0282105 A1 | 11/2008 | Deenadhayalan et al. | |
| 2009/0319716 A1 | 12/2009 | Nagadomi | |
| 2010/0023682 A1 | 1/2010 | Lee et al. | |
| 2010/0146193 A1 | 6/2010 | Jang et al. | |
| 2010/0174870 A1 | 7/2010 | Banerjee | |
| 2010/0180068 A1* | 7/2010 | Matsumoto | G06F 12/0246 711/E12.001 |
| 2011/0099323 A1 | 4/2011 | Syu | |
| 2011/0133778 A1* | 6/2011 | Kim | H03K 19/1733 326/46 |
| 2011/0161563 A1 | 6/2011 | Chang et al. | |
| 2011/0302446 A1 | 12/2011 | Becker-Szendy et al. | |
| 2012/0072801 A1 | 3/2012 | Takeuchi et al. | |
| 2012/0084484 A1 | 4/2012 | Post et al. | |
| 2013/0080688 A1 | 3/2013 | Park et al. | |
| 2013/0097369 A1* | 4/2013 | Talagala | G06F 12/0804 711/103 |
| 2013/0173857 A1 | 7/2013 | Cheon et al. | |
| 2014/0082265 A1 | 3/2014 | Cheng | |
| 2014/0095458 A1 | 4/2014 | Kim et al. | |
| 2014/0258588 A1 | 9/2014 | Tomlin et al. | |
| 2015/0046670 A1 | 2/2015 | Kim et al. | |
| 2015/0205539 A1 | 7/2015 | Moon et al. | |
| 2015/0347026 A1 | 12/2015 | Thomas | |
| 2016/0342509 A1 | 11/2016 | Kotte et al. | |
| 2017/0060668 A1* | 3/2017 | Farhan | G06F 12/0871 |
| 2017/0277438 A1 | 9/2017 | Gole et al. | |
| 2017/0371575 A1 | 12/2017 | Park et al. | |
| 2018/0032439 A1* | 2/2018 | Jenne | G06F 12/0804 |
| 2018/0129453 A1 | 5/2018 | Kim | |
| 2018/0239671 A1 | 8/2018 | Wei et al. | |
| 2018/0329818 A1* | 11/2018 | Cheng | G06F 11/1438 |
| 2018/0357170 A1 | 12/2018 | Benisty | |
| 2018/0364938 A1 | 12/2018 | Habbinga et al. | |
| 2019/0065387 A1 | 2/2019 | Duzly et al. | |
| 2019/0102250 A1 | 4/2019 | O'Krafka et al. | |
| 2019/0129841 A1 | 5/2019 | Kanno | |
| 2019/0187934 A1 | 6/2019 | Sicola et al. | |
| 2019/0220416 A1 | 7/2019 | Jung et al. | |
| 2019/0227735 A1 | 7/2019 | Shaked et al. | |
| 2019/0250847 A1 | 8/2019 | Frolikov | |
| 2019/0303292 A1 | 10/2019 | Byun | |
| 2019/0347204 A1 | 11/2019 | Du et al. | |
| 2020/0301780 A1* | 9/2020 | Kim | G06F 11/108 |
| 2020/0348742 A1* | 11/2020 | Nayak | H02J 9/005 |
| 2021/0055864 A1 | 2/2021 | Noh et al. | |
| 2021/0056023 A1 | 2/2021 | Jin et al. | |
| 2021/0240346 A1* | 8/2021 | Bernat | G06F 12/0868 |
| 2021/0303214 A1 | 9/2021 | Nakano et al. | |
| 2022/0318152 A1* | 10/2022 | Fuller | G06F 12/0804 |

FOREIGN PATENT DOCUMENTS

| | | | |
|---|---|---|---|
| KR | 101449524 | B1 | 10/2014 |
| KR | 10-1506675 | B1 | 3/2015 |
| KR | 10-1636248 | B1 | 7/2016 |
| KR | 10-2018-0024615 | A | 3/2018 |
| KR | 20190060328 | A | 6/2019 |

OTHER PUBLICATIONS

Non-final Office Action for related U.S. Appl. No. 16/877,239, dated Aug. 18, 2022.

Notice of Allowance for related U.S. Appl. No. 16/841,274, dated Oct. 1, 2021.

Final Office Action for related U.S. Appl. No. 16/877,239, dated Oct. 14, 2021.

Non-final Office Action for related U.S. Appl. No. 16/841,274, dated Jun. 24, 2021.

Non-Final Office Action for related U.S. Appl. No. 16/877,239, dated Apr. 16, 2021.

Final Office Action for related U.S. Appl. No. 16/877,239, dated May 12, 2022.

Non-final Office Action for related U.S. Appl. No. 17/000,082, dated Aug. 5, 2022.

Notice of Allowance dated Apr. 19, 2023 for U.S. Appl. No. 17/000,082.

Final Office Action for related U.S. Appl. No. 17/000,082, dated Jan. 25, 2023.

* cited by examiner

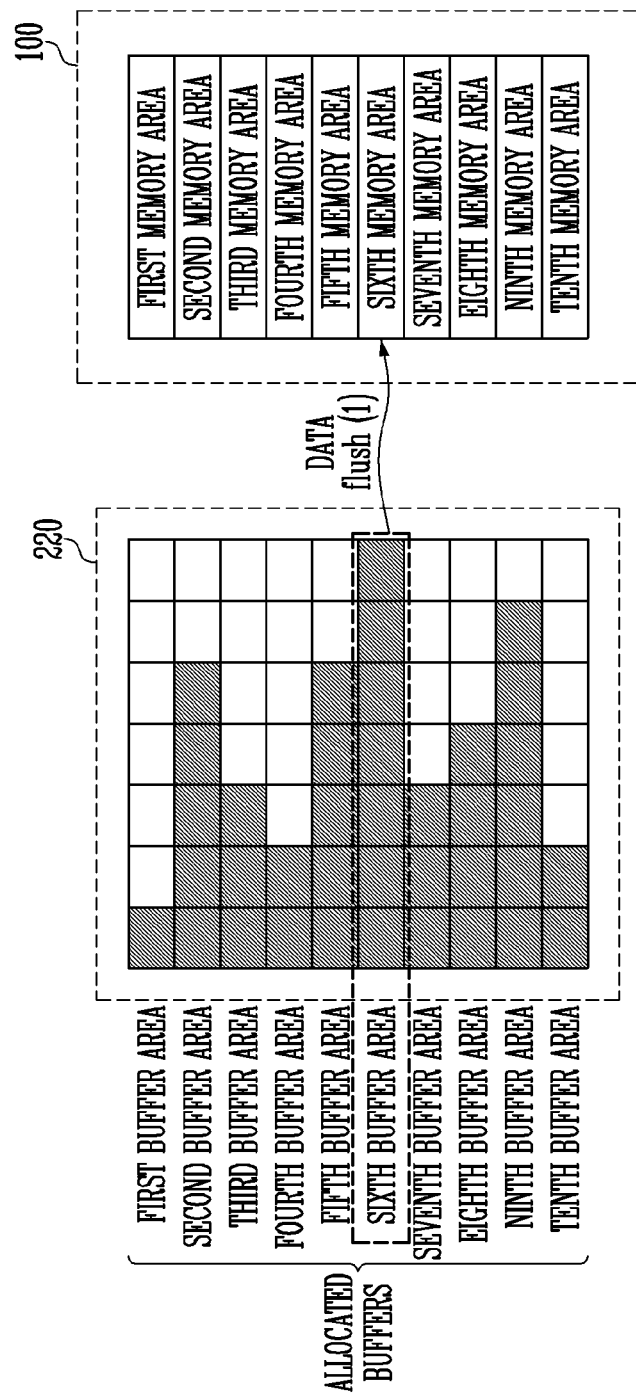

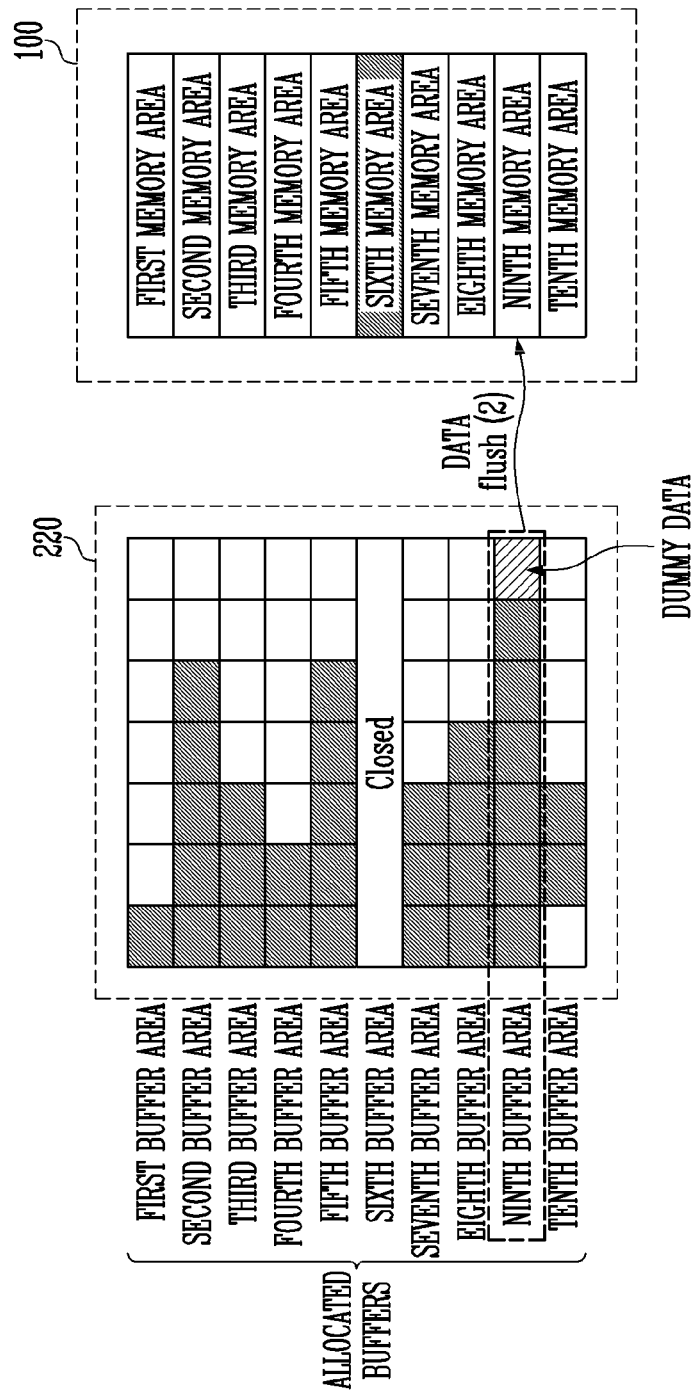

| BUFFER AREA ADDRESS | ZONE IDENTIFIER | STORED DATA SIZE |
|---|---|---|
| BFADD1 | 1 | 4K |
| BFADD2 | 2 | 2K |
| BFADD3 | 5 | 1K |
| BFADD4 | 6 | 2K |
| BFADD5 | 7 | 2K |
| BFADD6 | 8 | 4K |
| BFADD7 | 10 | 2K |
| BFADD8 | 11 | 1K |

MEMORY CONTROLLER BASED ON FLUSH OPERATION AND METHOD OF OPERATING THE SAME

CROSS-REFERENCE TO RELATED APPLICATION

The present application is a divisional of U.S. application Ser. No. 16/847,555, filed Apr. 13, 2020, which claims priority under 35 U.S.C. § 119(a) to Korean patent application number 10-2019-0116261, filed on Sep. 20, 2019, the entire disclosure of which is incorporated herein by reference in its entirety.

BACKGROUND

Field of Invention

The present disclosure relates to an electronic device including an auxiliary power device, and more particularly, to a memory controller and a method of operating the same.

Description of Related Art

A storage device is a device that stores data. The storage device includes a memory device in which data is stored and a memory controller controlling the memory device. A memory device may be implemented using a semiconductor such as silicon (Si), germanium (Ge), gallium arsenide (GaAs), or indium phosphide (InP). The memory device may be classified as a volatile memory device or a non-volatile memory device.

A volatile memory device is a memory device in which stored data is lost when its power supply is cut off. The volatile memory device may be any of a static RAM (SRAM), a dynamic RAM (DRAM), a synchronous DRAM (SDRAM), and the like. The non-volatile memory device is a memory device that maintains stored data even though its power supply is cut off. The non-volatile memory device may be any of a read only memory (ROM), a programmable ROM (PROM), an electrically programmable ROM (EPROM), an electrically erasable and programmable ROM (EEPROM), a flash memory, a phase-change RAM (PRAM), a magnetic RAM (MRAM), a resistive RAM (RRAM), a ferroelectric RAM (FRAM), and the like. Flash memory is largely divided into a NOR type and a NAND type.

The storage device may include an auxiliary power device that may supply power for a time (such as after a main power supply is cut off or when the main power supply is delivering an incorrect voltage) in order to ensure the reliability of data stored in the storage device.

SUMMARY

An embodiment of the present disclosure provides a memory controller having improved reliability and a method of operating the same.

According to an embodiment of the present disclosure, a memory controller that is communicatively coupled to a host and that controls an operation of a memory device may include a buffer memory configured to store data for a plurality of allocated buffer areas, and a buffer memory controller configured to receive from the host a buffer allocation request corresponding to a first memory area in the memory device, the first memory area corresponding to a plurality of physical addresses, in response to the buffer allocation request, determine whether to allocate a first buffer area in the buffer memory according to one or more of power information received from the host and power information of an auxiliary power device coupled to the memory controller and the memory device, and in response to determining to allocate the first buffer area, allocate the first buffer area in the buffer memory and generate an area map table in which a plurality of logical addresses provided from the host and associated with the first buffer area are mapped to the plurality of physical addresses corresponding to the first memory area.

According to an embodiment of the present disclosure, a memory controller that controls an operation of a memory device including a plurality of memory areas may include a buffer memory configured to store data for a plurality of allocated buffer areas, the plurality of allocated buffer areas temporarily storing data to be respectively stored in the plurality of memory areas, and a buffer memory controller configured to control the buffer memory and the memory device to store data stored in the plurality of allocated buffer areas into the memory device, based on information on power that may be provided from a host to the memory controller, when supply of main power provided to the memory controller is abnormally cut off.

According to an embodiment of the present disclosure, a method of operating a memory controller that controls an operation of a memory device including a plurality of memory areas may include receiving a buffer allocation request from a host, and providing a response to the buffer allocation request based on buffer state information on a state of a plurality of allocated buffer areas respectively corresponding to the plurality of memory areas, and power information indicating a state of power that may be provided from the host to the memory controller.

According to an embodiment of the present technology, a memory controller providing improved reliability and a method of operating the same are provided.

BRIEF DESCRIPTION OF THE DRAWINGS

FIG. 6 illustrates a first flush operation according to an embodiment.

FIG. 7 illustrates a second flush operation following the first flush operation of FIG. 6 according to an embodiment.

FIG. 9 illustrates buffer state information of FIG. 8 according to an embodiment.

DETAILED DESCRIPTION

Specific structural or functional descriptions of embodiments according to the concept which are disclosed in the present specification or application are illustrated only to describe the embodiments according to the concept of the present disclosure. The embodiments according to the concept of the present disclosure may be carried out in various forms and the descriptions are not limited to the embodiments described in the present specification or application.

Hereinafter, an embodiment of the present disclosure will be described with reference to the accompanying drawings so that those skilled in the art may easily implement embodiments of the present disclosure.

Figure 1:
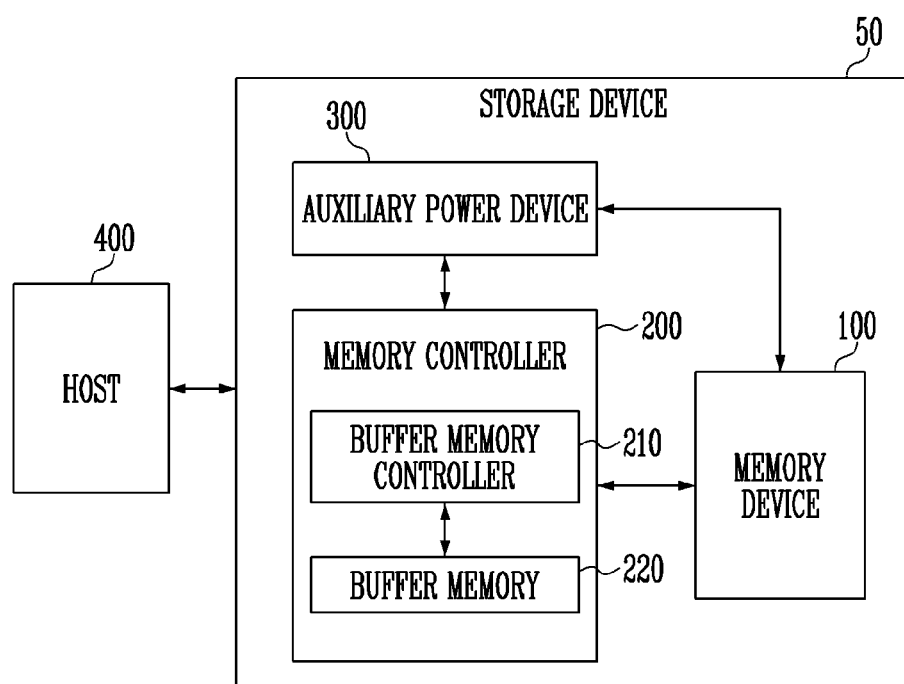
FIG. 1 illustrates a storage device including a memory controller according to an embodiment of the present disclosure.

FIG. 1 illustrates a storage device 50 including a memory controller 200 according to an embodiment of the present disclosure.

Referring to FIG. 1, the storage device 50 may include a memory device 100, the memory controller 200, and an auxiliary power device (or an auxiliary power supply) 300.

The storage device 50 may be a device that stores data under control of a host 400 such as a cellular phone, a smartphone, an MP3 player, a laptop computer, a desktop computer, a game player, a TV, a tablet PC, or an in-vehicle infotainment system.

The storage device 50 may be manufactured as one of various types of storage devices according to a host interface that is a communication method with the host 400. For example, the storage device 50 may be configured as any one of an SSD, a multimedia card in a form of an MMC, an eMMC, an RS-MMC or a micro-MMC, a secure digital card in a form of an SD, mini-SD or micro-SD card, a universal serial bus (USB) storage device, a universal flash storage (UFS) device, a personal computer memory card international association (PCMCIA) card type storage device, a peripheral component interconnection (PCI) card type storage device, a PCI express (PCI-E) card type storage device, a compact flash (CF) card, a smart media card, and a memory stick.

The storage device 50 may be manufactured as any one of various types of packages. For example, the storage device 50 may be manufactured as any one of a package on package (POP), a system in package (SIP), a system on chip (SOC), a multi-chip package (MCP), a chip on board (COB), a wafer-level fabricated package (WFP), and a wafer-level stack package (WSP).

The memory device 100 may store data. The memory device 100 may be controlled by the memory controller 200. The memory device 100 may include a memory cell array (not shown) including a plurality of memory cells storing the data. The memory cell array may include a plurality of memory blocks. The memory block may include a plurality of memory cells. A memory block may be a unit for performing an erase operation of erasing data stored in the memory device 100. In an embodiment, each memory block may include a plurality of pages. The page may be a unit for performing a program operation of storing data in the memory device 100 or a read operation of reading data stored in the memory device 100. In an embodiment, the memory device 100 may be a non-volatile memory device.

In an embodiment, the memory device 100 may be a double data rate synchronous dynamic random access memory (DDR SDRAM), a low power double data rate 4 (LPDDR4) SDRAM, a graphics double data rate (GDDR) SDRAM, a low power DDR (LPDDR), a Rambus dynamic random access memory (RDRAM), a NAND flash memory, a vertical NAND flash memory, a NOR flash memory device, a resistive random access memory (RRAM), a phase-change memory (PRAM), a magnetoresistive random access memory (MRAM), a ferroelectric random access memory (FRAM), a spin transfer torque random access memory (STT-RAM), or the like. In the present specification, for convenience of description, embodiments wherein the memory device 100 is a NAND flash memory are described, but embodiments are not limited thereto.

In an embodiment, the memory device 100 may be implemented in a three-dimensional array structure. The present disclosure may be applied not only to a flash memory device in which a charge storage layer is a conductive floating gate (FG), but also to a charge trap flash (CTF) in which the charge storage layer is an insulating film.

In an embodiment, each of the memory cells included in the memory device 100 may operate as a single level cell (SLC) that stores one data bit, a multi-level cell (MLC) that stores two data bits, a triple level cell (TLC) that stores three data bits, or a quad level cell (QLC) that stores four data bits.

The memory device 100 may receive a command and an address from the memory controller 200. The memory device 100 is configured to access an area selected by the received address of the memory cell array. Accessing the selected area means performing an operation corresponding to the received command on the selected area. For example, the memory device 100 may perform a write operation (program operation), a read operation, or an erase operation. During the program operation, the memory device 100 may program data to the area selected by the address. During the read operation, the memory device 100 may read data from the area selected by the address. During the erase operation, the memory device 100 may erase data stored in the area selected by the address.

The memory controller 200 may control an overall operation of the storage device 50.

When power is supplied to the storage device 50, the memory controller 200 may execute firmware. The firmware may include a host interface layer (HIL) that receives requests from the host 400 and outputs responses to the host 400, a flash translation layer (FTL) that manages operations between an interface of the host device and an interface of the memory device 100, and a flash interface layer (FIL) that provides commands to the memory device 100 and receives responses from the memory device 100.

The memory controller 200 may receive data and a logical address (LA) from the host 400, and may convert the LA into a physical address (PA) indicating an address of memory cells in which data included in the memory device 100 is to be stored. The LA may be a logical block address (LBA), and the PA may be a physical block address (PBA).

The memory controller 200 may control the memory device 100 to perform a program operation, a read operation, or an erase operation according to the request from the host 400. During the program operation, the memory controller 200 may provide a program command, a PA, and data to the memory device 100. During the read operation, the memory controller 200 may provide a read command and a PA to the memory device 100. During the erase operation, the memory controller 200 may provide an erase command and a PBA to the memory device 100.

The memory controller 200 may at times control the memory device 100 to perform program operations, read operations, or erase operations in the absence of a request from the host 400. For example, the memory controller 200 may control the memory device 100 to perform one or more program operations, read operations, and/or the erase operations in order to perform a background operation such as wear leveling, garbage collection, or read reclaim.

The auxiliary power device 300 may provide auxiliary power to the memory device 100 and the memory controller 200. The auxiliary power may be supplied to the memory device 100 and the memory controller 200 when main power (not shown) supplied to the storage device 50 is in an abnormal state. For example, the main power may be in an abnormal state when a voltage level of the main power is equal to or less than a specific voltage level. The main power may also be in an abnormal state when the supplying of the main power is abnormally cut off. For example, an abnormal state of the main power may be a sudden power off (SPO) state. The auxiliary power device 300 may include one or more auxiliary power cells (such as super capacitors, not shown). When the abnormal state of the main power is sensed, the auxiliary power stored in the auxiliary power cells may be provided to the memory device 100 and the memory controller 200. The memory device 100 and the memory controller 200 may perform various operations using the provided auxiliary power. The auxiliary power may correspond to an amount of power provided by the auxiliary power device 300 to the memory device and the memory controller.

A time required to store data in a volatile memory device may be substantially less than a time required to store that data in a non-volatile memory device. In order to provide a quick response to a write request of the host 400, the storage device 50 may temporarily store data in a buffer memory 220. The data stored in the buffer memory 220 may subsequently be stored in the memory device 100.

The buffer memory 220 may be a volatile memory device. Therefore, when the power is cut off, the data stored in the buffer memory 220 may not be maintained.

The buffer memory 220 may lose the temporarily stored data when the power is not provided. Therefore the storage device 50 may store the temporarily stored data, which is stored in the buffer memory 220, in the memory device 100 using the auxiliary power when the main power is the abnormal state. The auxiliary power device 300 may supply the auxiliary power for a time during which all or portions of the data stored in the volatile memory device of the buffer memory 220 may be stored in the memory device 100.

The data stored in the buffer memory 220 may be stored in the memory device 100 in response to an instruction to perform a flush operation received from the host 400. The flush operation stores data which is temporarily stored in the buffer memory 220 into the memory device 100. The instruction to perform the flush operation may be periodically provided to the memory controller 200 by the host 400. Also, the memory controller 200 may sense a state of the buffer memory 220 and perform the flush operation without receiving an instruction from the host 400.

The buffer memory controller 210 may allocate a buffer area in the buffer memory 220. Allocating the buffer area may include creating a mapping between a physical address of the memory device 100 and a logical address input from the host. Allocating the buffer area according to an embodiment will be described below with reference to FIG. 2.

The buffer memory controller 210 may receive a write request from the host 400 and in response allocate a buffer area in the buffer memory 220 according to a state of the buffer memory 220. Data received from the host 400 may be temporarily stored in the allocated buffer area of the buffer memory 220. Alternatively, depending on the state of the buffer memory 220, the buffer memory controller 210 may respond to the write request of the host 400 by sending the host 400 a delay response and performing a flush operation. The delay response may indicate to the host 400 that the requested allocation for a new buffer area was not performed.

Referring to FIG. 1, although the buffer memory controller 210 and the buffer memory 220 are included in the memory controller 200, in various embodiments, the buffer memory controller 210 and the buffer memory 220 may be included in the storage device 50 and may be positioned outside the memory controller 200.

Figure 2:
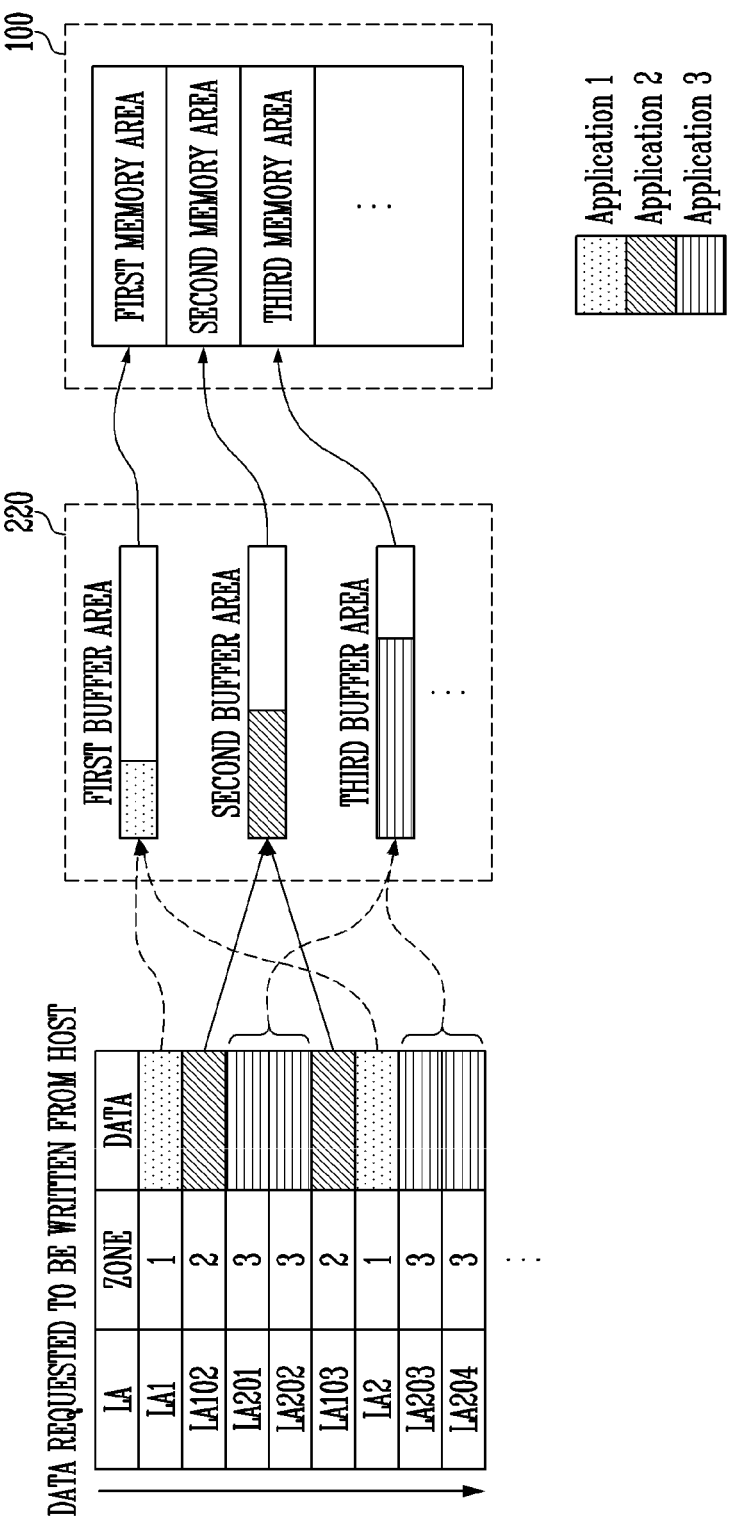
FIG. 2 illustrates effects of buffer allocation requests provided by a host according to an embodiment.

FIG. 2 is a diagram for describing processing of buffer allocation requests provided by a host.

The host may provide the write request to the storage device. The memory device 100 may include a plurality of memory areas. The memory areas may include a memory cell that stores data. The plurality of memory areas may respectively store data corresponding to logical addresses of a specific respective range. The logical addresses of the write requests input from the host may not be input in an order of each memory area and may be input randomly. The storage device according to an embodiment of the present disclosure includes a buffer memory 220 in which a plurality of buffer areas may be allocated so that data is organized according to ranges of the logical addresses to which the data is to be stored in the memory areas. The plurality of buffer areas may correspond to the plurality of memory areas included in the memory device 100, respectively.

Each application being performed on the host may use data having different respective logical address ranges. The application may indicate a type of the data. In another embodiment, the application may be an attribute of the data determined by the host.

Data related to a first application may be associated with a first zone (Zone 1) and have logical addresses ranging from a 0-th logical address LBA 0 to a 99-th logical address LBA 99. In addition, data related to a second application may be associated with a second zone (Zone 2) and have logical addresses ranging from a 100-th logical address LBA 100 to a 199-th logical address LBA 199. Data related to a third application may be associated with a third zone (Zone 3) and have logical addresses ranging from a 200-th logical address LBA 200 to a 299-th logical address LBA 299.

In the example shown in FIG. 2, the respective logical addresses of the write request received from the host are input in an order of a first logical address LA1, a 102nd logical address LA102, a 201st logical address LA201, a 202nd logical address LA202, a 103rd logical address LA103, a second logical address LA2, a 203rd logical address LA203, and a 204th logical address LA204. Because the logical addresses of data to be stored in each memory area are determined by the host, write request data may be temporarily stored in a buffer area according to the logical address, the buffer area corresponding to a corresponding memory area.

In an embodiment, the write request input from the host may implicitly or explicitly include a buffer open request. For example, as described above, the memory areas corresponding to respective logical address ranges may be determined in advance. Therefore, a write request for a specific logical address provided by the host may indicate that the write requested data is to be stored in a specific memory area. In addition, the write request may include a buffer open request requesting to open a specific buffer area for temporarily storing the data of the write request before the write request data is stored in the specific memory area. As the buffer open request is input to the memory controller, a buffer open operation in which the buffer area corresponding to the memory area in which data is to be temporarily stored is allocated may be performed. The opened buffer area may be in a state capable of temporarily storing data received from the host. Hereinafter, an open buffer area may refer or corresponding to an allocated buffer area. In addition, hereinafter, a buffer open request may have refer or corresponding to a buffer allocation request.

The allocated buffer area may be an area prepared for temporarily storing the data received from the host. A plurality of buffer areas may be opened according to the write requests from the host. For example, the host may not indicate that logical addresses of input data are stored in the same memory area. In this case, the plurality of buffer areas corresponding to the respective memory areas may be opened. Each of the buffer areas may temporarily store data corresponding to a logical address of a predetermined range. Therefore, amounts of the data temporarily stored in each of the buffer areas may be different. According to an embodiment, at some instant, the plurality of buffer areas may be opened, and the amounts of the data stored in the plurality of buffer areas may be different from each other. According to another embodiment, an opened buffer area and an unopened buffer area, that is, an unallocated buffer area may exist together in the buffer memory 220. When the amount of the data stored in one or more of the buffer areas reaches a predetermined size, the flush operation may be performed so that the data in the one or more buffer areas is respectively transferred to one or more corresponding memory areas. Since the flush operation may be independently performed for each buffer area, all the buffer areas do not have to be simultaneously flushed.

In another embodiment, respective sizes of the opened buffer areas may be different from each other. The respective sizes of the opened buffer areas may indicate a maximum amount of data that may be respectively stored in each of the buffer areas. The size of the opened buffer areas may determine whether to start a flush operation. For example, among the plurality of buffer areas included in the buffer memory 220, a maximum size of a first buffer area may be 4 Kbytes, and a maximum size of a second buffer area may be 8 Kbytes. A maximum size of a third buffer area may be one of 4 Kbytes and 8 Kbytes, or another size that does not correspond to any of 4 Kbytes and 8 Kbytes. When data is temporarily stored in the first buffer area and a total size of the stored data in that buffer area reaches 4 Kbytes, a flush operation in which the data in the first buffer area is stored into the first memory area may be performed. When the data is temporarily stored in the second buffer area and the total size of the stored data in that buffer area reaches 8 Kbytes, the flush operation may be performed to store the data in the second buffer area into the second memory area. The flush operation may be performed on other buffer areas in the same manner. Since the flush operation may be separately performed for each buffer area, the flush operation of all buffer areas does not have to be performed simultaneously.

The write request or the buffer open request provided by the host may further include information indicating a size of the opened buffer area. Referring to FIG. 2, the host may request to write the 102nd logical address LA102 and the 103rd logical address LA103. The write request may also include information on the size of the buffer area to allocate. For example, if the write request received from the host includes buffer area size information indicating a size of 4 Kbytes, the size of the second buffer area in which the data having the 102nd logical address LA102 and the 103rd logical address LA103 is to be temporarily stored may be determined as 4 Kbytes as indicated in the write request received. That is, the size of the opened buffer area may be determined according to the write request provided by the host.

Referring to FIG. 2, regardless of an input order, the data corresponding to the write requests may be temporarily stored in a respective buffer area. Data corresponding to the first logical address LA1 and the second logical address LA2 may be stored in the first buffer area. Data corresponding to the 102nd logical address LA102 and the 103rd logical address LA103 may be stored in the second buffer area. Data corresponding to the 201st logical address LA201 to the 204-th logical address LA204 may be stored in the third buffer area.

The data stored in the first buffer area may be data that will be stored in a first memory area of the memory device 100. The data stored in the second buffer area of the buffer memory 220 may be data that will be stored in a second memory area of the memory device 100. The data stored in the third buffer area of the buffer memory 220 may be data that will be stored in a third memory area of the memory device 100. According to the described process, the data may be stored in memory areas determined according to the respective logical addresses of the data.

The memory areas included in the memory device 100 may include memory cells. Each of the memory areas may be erased. That is, each of the memory areas may correspond to a memory block that is a unit of an erase operation of the memory device 100, or may correspond to a plurality of memory blocks. When a request to erase data related to the first application (corresponding to Zone 1 in FIG. 2) is received, the data stored in the first memory area may be erased. The data of the second application (corresponding to Zone 2) and the third application (corresponding to Zone 3) stored in the second memory area and the third memory area may not be affected by the erase operation of the first memory area. That is, even though the data stored in the first memory area is erased, the data stored in the second memory area and the third memory area, which are memory areas different from the first memory area, may be maintained.

According to an embodiment, the host may provide a buffer allocation request to the memory controller. The buffer allocation request may be a request to allocate an area of the buffer memory 220 so that data may be stored there. Allocating the area of the buffer memory may include an operation of mapping a physical address corresponding to a newly input logical address. That is, according to the buffer allocation request of the host, an area map table may be generated in which physical addresses of the memory area are mapped to logical addresses associated with the buffer allocation request. The area map table may include a mapping relationship between logical addresses of data to be stored in a corresponding memory area and physical addresses of the memory area where the data is to be stored. In an embodiment, the area map table may include information on a start logical address where data is to be stored in a corresponding area, an end logical address, or the last input logical address. The area map table may also include information on a position where data is to be next stored in a corresponding memory area.

For example, the host may request that data related to the first application be written to the memory device. Optionally, a first buffer area allocation request may be sent from the host to the memory controller. An area map table (or an entry in such a table) may be generated in which the first logical address LA1 (which is a logical address of data to be stored by the first application) is mapped to a physical address indicating a first memory area of the memory device 100 (where data is to be finally stored). In addition, the first buffer area of the buffer memory 220 may be opened. The opened buffer area may be in a state in which the data received from the host may be temporarily stored therein. Thereafter, the data related to the first application received from the host may be temporarily stored in the first buffer area. In an embodiment, a flush operation to store the data temporarily stored in the first buffer area into the first memory area may be performed after a preset period of time elapses. In another embodiment, a flush operation to store the data temporarily stored in the first buffer area into the first memory area may be performed when a preset amount of data has been written into the first buffer area.

Next, the host requests that data related to the second application be written. The data of the application 1 corresponding to LA1 may be temporarily stored in the first buffer area, and there may exist an area in which the data is not yet stored in the first buffer area. The host may request allocation of the second buffer area different from the first buffer area so that the data related to the first application and the data related to the second application are stored in different memory areas. Therefore, an area map table may be generated in which the 102nd logical address LA102 that is the logical address of data related to the second application is mapped to a physical address indicating the second memory area of the memory device 100 where the data is to be finally stored. In addition, the second buffer area of the buffer memory 220 may be opened. The data related to the second application received from the host may be temporarily stored in the second buffer area.

Next, the host requests that data related to the third application be written. In the buffer memory 220, the first buffer area and the second buffer area may be allocated, and an area in which data is empty may exist in each buffer area. The data related to the third application is to be finally stored in a memory area different from that in which the data related to the first application and the second application are stored. Therefore, the host may request allocation of the third buffer area that is not either of the first buffer area and the second buffer area. Thus, an area map table may be generated in which the 201st logical address LA201 and the 202nd logical address LA202 that are the logical addresses of data related to the third application is mapped to a physical address indicating the third memory area of the memory device 100 where the data is to be finally stored. In addition, the third buffer area of the buffer memory 220 may be opened. The data related to the third application received from the host may be temporarily stored in the third buffer area.

Thereafter, the host requests that data related to the second application having the 103rd logical address LA103 be written. In the buffer memory 220, the second buffer area that temporarily stores data related to the second application is already allocated. Accordingly, the data of the 103rd logical address LA103 may be stored in the second buffer area following the data of the 102nd logical address LA102. Therefore, the data having the 102nd logical address LA102 and the data having the 103rd logical address LA103 may be temporarily stored in the second buffer area sequentially.

Next, host requests that the data related to the first application having the second logical address LA2 be written. Since the first buffer area that temporarily stores the data related to the first application is already allocated in the buffer memory 220, the data related to the first application having the second logical address LA2 may be temporarily stored in the first buffer area following the data of the first logical address LA1. Similarly, the data of the first logical address LA1 and the data of the second logical address LA2 may be temporarily stored in the first buffer area sequentially.

Next, the host requests the data related to the third application corresponding to the 203rd logical address LA203 and the 204th logical address LA204 be written. Since the third buffer area that temporarily stores the data related to the third application is already allocated in the buffer memory 220, the data related to the application 3 corresponding to the 203rd logical address LA203 and the 204th logical address LA204 may be temporarily stored in the third buffer area following the data corresponding to the 201st and $202^{nd}$ logical addresses LA201 and LA202. Therefore, the data having the 201st to $204^{th}$ logical addresses LA201 to LA204 may be temporarily stored in the third buffer area sequentially.

The flush operation in which the data temporarily stored in each buffer area is stored in the memory device 100 may be performed. Therefore, the data temporarily stored in the first buffer area may be stored in the first memory area of the memory device 100 by flushing the first buffer area. Similarly, the data temporarily stored in the second buffer area may be stored in the second memory area of the memory device 100 by flushing the second buffer area, and the data temporarily stored in the third buffer area may be stored in the third memory area of the memory device 100 by flushing the third buffer area.

According to an embodiment, although the data related to the first to third applications are received from the host in a mixed order, the data of each application may be separated and stored by allocating the buffer areas corresponding to the respective memory areas of the application. That is, according to an embodiment, the data requested to be written in a random order may be written to the memory device 100 in a sequential order. The data written in the sequential order may be read at high speed and provided to the host when a read request is input from the host.

Figure 3:
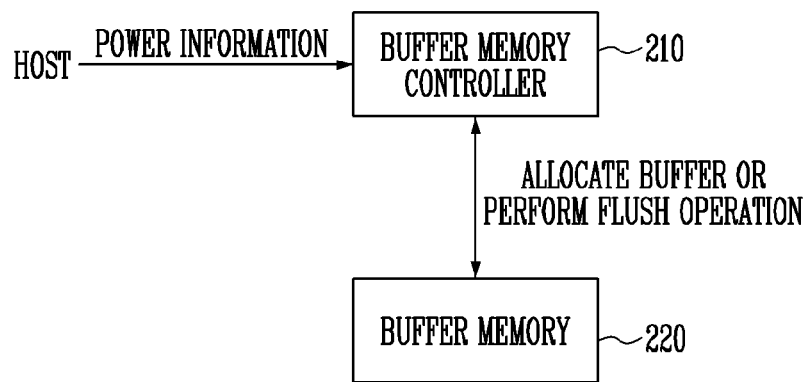
FIG. 3 illustrates allocating a buffer area of a buffer memory according to power information of the host or performing a flush operation of storing data into a memory device according to an embodiment.

FIG. 3 illustrates a buffer memory controller 210 that, depending on power information from the host, performs one or more of allocating the buffer area of the buffer memory 220 or performing the flush operation of storing data in the buffer memory 220 into a memory device.

As described with reference to FIG. 2, according to an embodiment, the plurality of buffer areas may be allocated. The sizes of the data temporarily stored in the allocated buffer areas may be different from each other. That is, a buffer area full of data may exist, and a buffer area including an area in which data is empty may exist together. This is because the size of data input for each application from the host is different, and the data is temporarily stored in distinct respective buffer areas for the plurality of applications.

As described above with reference to FIG. 1, in a situation where the input main power becomes unstable, the auxiliary power may be supplied to secure reliability of the storage device. The auxiliary power may be configured to have an energy storage capacity sufficient to ensure that an operation in which all data temporarily stored in each of the buffer areas are stored in a non-volatile memory device can be completed. The auxiliary power may be supplied during a time when all data temporarily stored in each of the buffer areas are being stored in the non-volatile memory device. In an embodiment, as the number of allocated buffer areas increases, a required amount of the auxiliary power may increase. In another embodiment, as the size of the data stored in the buffer areas increases, the required amount of the auxiliary power may increase. As the required amount of the auxiliary power increases, the auxiliary power device may require a larger number of auxiliary power cells or may require higher capacity auxiliary power cells. According to an embodiment, high reliability of data may be secured by using an auxiliary power device of the storage device (hereinafter, the storage auxiliary power device) including a limited number of auxiliary power cells of a predetermined capacity, and an auxiliary power device of a host coupled to the storage device (hereinafter, the host auxiliary power device).

Specifically, the buffer memory controller 210 may receive a buffer allocation request from the host. In addition, the buffer memory controller 210 may receive power information from the host. The power information may include information on an amount of power (for example, a number of ampere-seconds at a predetermined voltage) that may be provided from the host to the memory controller when the supply of the main power is abnormally cut off. The amount of power provided by the host may be provided by the auxiliary power cell of a host auxiliary power device included in the host.

For example, the power information may indicate that the amount of power that may be provided from the host to the memory controller is less than a predetermined threshold value. In another example, the power information may indicate that the amount of power that may be provided from the host to the memory controller is equal to or greater than the predetermined threshold value.

In an embodiment, the host may provide the power information indicating a state in which the host may provide the amount of power to the memory controller. Alternatively, the host may provide the power information indicating a state in which the amount of power that may be provided from the host to the memory controller is equal to or greater than the threshold value. The state may refer to a state in which the amount of power required while the flush operation is performed on the data temporarily stored in the buffer memory 220 may be supplied by the host. The buffer memory controller 210 may receive the power information and allocate a buffer area according to the request of the host and the power information.

In another embodiment, the size of the allocated buffer area may be changed according to the power information of the host. For example, the power information provided by the host may include power amount information that may guarantee that 4 Kbytes of data can be flushed from the buffer memory to the memory device. In this case, the size of the buffer area allocated according to the buffer allocation request of the host may be determined as 4 Kbytes. Alternatively, the power information provided by the host may include power amount information that may guarantee that 2 Kbytes of data can be flushed to the memory device. In this case, the size of the buffer area allocated according to the buffer allocation request of the host may be determined as 2 Kbytes. That is, the size of the allocated buffer area may be determined according to the power amount information provided by the host.

In an embodiment, the host may provide power information indicating a state in which the host may not provide the any auxiliary power to the memory controller. In another embodiment, power information may be provided indicating a state in which the amount of power that may be provided from the host to the memory controller is less than the predetermined threshold value. In response, the buffer memory controller 210 may perform the flush operation on some of the data temporarily stored in the buffer memory 220. After the flush operation, an additional buffer area may be allocated according to the request of the host, selectively.

Figure 4:
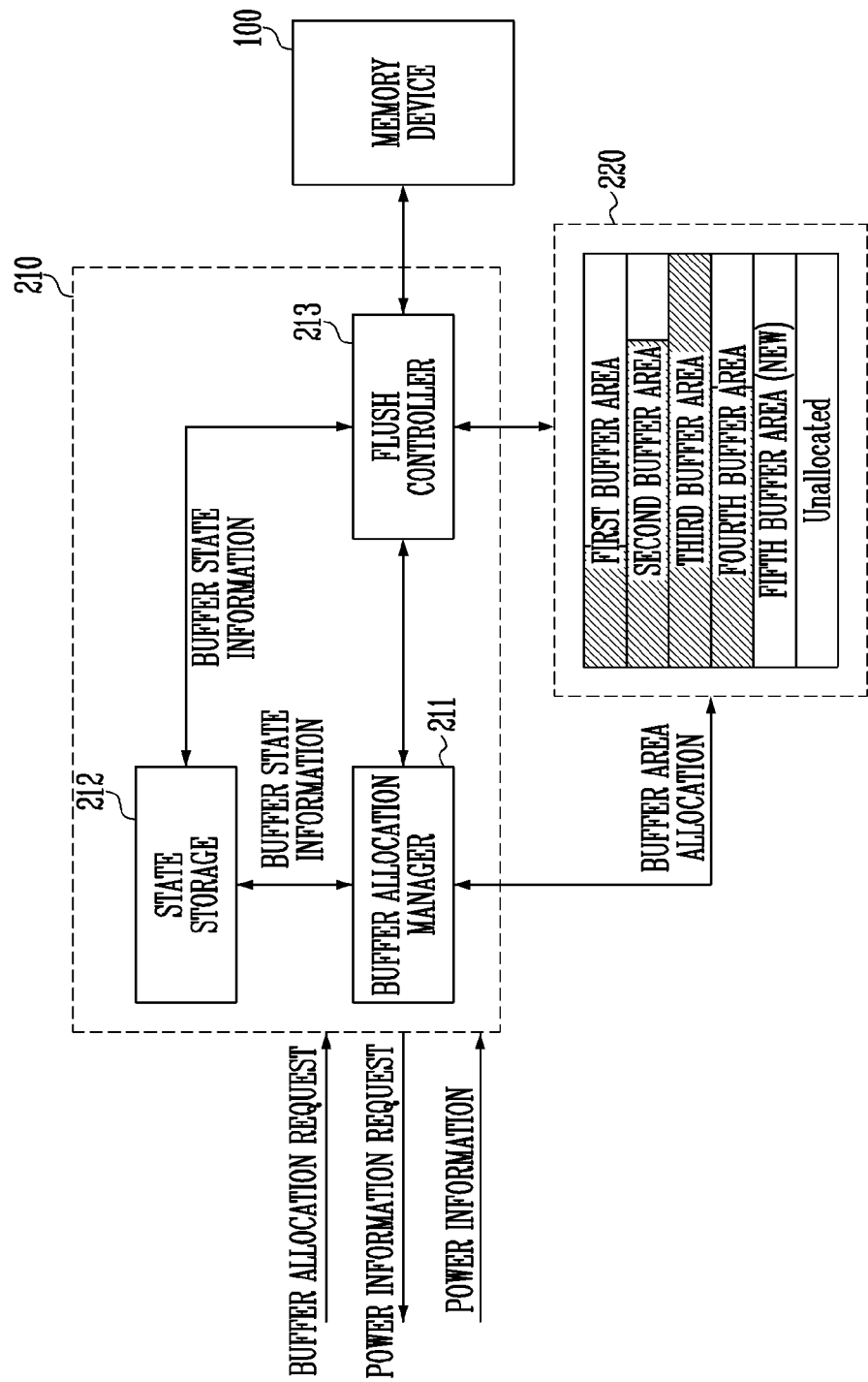
FIG. 4 illustrates an operation of a buffer memory controller according to an embodiment.

FIG. 4 is a diagram illustrating in detail operations of a buffer memory controller 210 according to an embodiment.

The buffer memory controller 210 may allocate the buffer area in response to the request received from the host. The buffer memory controller 210 may include a buffer allocation manager 211, a state storage 212, and a flush controller 213. The buffer memory 220 may include a plurality of buffer areas (first to fourth buffer areas and an unallocated area). A detailed description of the state storage 212 and the flush controller 213 will be described later with reference to FIGS. 6 to 9.

Specifically, the buffer memory controller 210 may receive the request for writing data from the host. Hereinafter, the request for writing data may be considered a buffer allocation request. Referring to FIG. 4, first to fourth buffer areas are allocated in the buffer memory 220. In this example, the buffer allocation request received from the host is a request for allocating a new buffer area different from the allocated first to fourth buffer areas.

In an embodiment, the buffer allocation manager 211 may manage a buffer allocation operation based on buffer state information included in the state storage 212 and a reference value related to auxiliary power. The buffer state information may include the number of a plurality of allocated buffer areas. Alternatively or additionally, the buffer state information may include information on size(s) of data temporarily stored in the plurality of allocated buffer areas. The reference value may include information on a state of the storage auxiliary power device of the storage device. For example, the buffer state information may include information corresponding to the amount of the auxiliary power that may be provided by the storage auxiliary power device of the storage device that includes the buffer memory controller 210.

In a first embodiment, the reference value may indicate a number of buffer areas which can be flushed using the auxiliary power provided by the storage auxiliary power device, and when the number of the plurality of allocated buffer areas is less than the reference value, the new buffer area may be allocated in response to the request from the host. In a second embodiment, the reference value may indicate an amount of data in the buffer areas which can be flushed using the auxiliary power provided by the storage auxiliary power device, and when the size of the data stored in the plurality of allocated buffer areas is less than the reference value, the new buffer area may be allocated in response to the request from the host. Referring to FIG. 4, a fifth buffer area NEW may be allocated as the new buffer area.

When, in the first embodiment, the number of allocated buffer areas is equal to greater than the number indicated by the reference value, or when, in the second embodiment, the size of the data stored in the plurality of buffer areas is equal to or greater than the amount of data indicated by reference value, a delay response may be provided with respect to the request of the host. In addition, power information may be requested and received from the host. The power information received from the host may indicate a state in which an amount of power may be provided to the memory controller even when the main power is abnormal, such as, for example, the amount of power that may be provided to the memory controller by the host auxiliary power device. For example, the power information may include information in which the amount of power that may be provided from the host is equal to or greater than a threshold value, in which case the buffer allocation manager 211 may allocate the new buffer area even though the buffer state information of the plurality of allocated buffer areas (e.g., the number of allocated buffer areas or total size of data stored therein) is equal to or greater than the reference value, because the host is in a state in which the host may provide a sufficient additional amount of auxiliary power to ensure that the additional new buffer area can also be flushed if the main power becomes abnormal. In another embodiment, the power information received from the host may indicate a state in which the sufficient amount of additional auxiliary power may not be provided to the memory controller. For example, the power information may include information in which the amount of power that may be provided from the host (and in particular, the amount that may be provided even when the main power is abnormal) is less than the threshold value, in which case the buffer allocation manager 211 may perform an operation of flushing data stored in one or more of the allocated buffer areas to the memory device 100 without allocating the new buffer area. Once the flush operation is performed, the new buffer area may be allocated. The new buffer area may be a buffer area on which the flush operation was performed. Alternatively, the new buffer area may be the new area (for example, the fifth buffer area shown in FIG. 4) other than a buffer area on which the flush operation was performed. When the flush operation is performed, the specific operation details of the flush controller 213 will be described with reference to FIGS. 6 to 7.

FIGS. 5A to 5D are diagrams illustrating respective examples of requests received from the host.

Referring to FIGS. 5A to 5D, the write request received from the host, that is, the buffer allocation request, may be implemented by various embodiments.

Figure 5A:
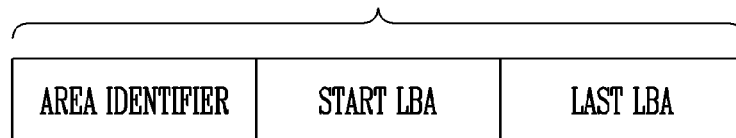
FIGS. 5A, 5B, 5C, and 5D illustrate respective examples of a request received from the host by a memory controller according to an embodiment.

Referring to FIG. 5A, the buffer allocation request may include an area identifier, a start LBA, and a last LBA. The area identifier may indicate an application type of the data requested to be written by the host. In another embodiment, the area identifier may indicate the memory area in which data is to be stored in the memory device. Alternatively, the area identifier may indicate the buffer area corresponding to the memory area in which data is to be stored in the memory device. The start LBA and the last LBA may indicate a start LBA and a last LBA of the data requested to be written, respectively. The size of the data may be calculated as a value corresponding to a difference between the start LBA and the last LBA.

Figure 5B:

Referring to FIG. 5B, the buffer allocation request may include the area identifier, the start LBA and data size information. The description repetitive to the description related to FIG. 5A is omitted. When the size information of DATA is known, the last LBA may be calculated from the start LBA.

Figure 5C:

Referring to FIG. 5C, the buffer allocation request may include the start LBA and the last LBA. The type of the application may be distinguished according to a range of LBA. For example, as described with reference to FIG. 2, the logical address of data related to a first application may include LA1 to LA99, the logical address of data related to a second application may include LA100 to LA199, and the logical address of the data related to a third application may include LA200 to LA299. Therefore, a relationship between the data and the application may be recognized according to the start LA provided by the host. In addition, since each application is stored in a different memory area, information on a memory area where the application is to be stored or a buffer area corresponding thereto may be obtained. The size of the data may be calculated as a value corresponding to the difference between the start LA and the last LA.

Figure 5D:
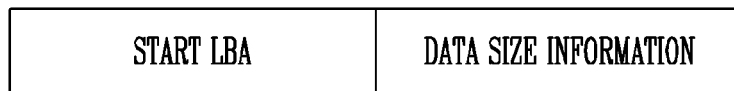

Referring to FIG. 5D, the buffer allocation request may include the start LBA and the data size information. Similarly, the type of the application may be distinguished according to the start LBA. In addition, when the size information of data is known, the last LBA may be calculated from the start LBA.

FIG. 6 illustrates an operation of the flush controller 213 according to an embodiment.

Referring to FIG. 6, the buffer memory 220 may include a plurality of allocated buffer areas (first to tenth buffer areas). Each of the plurality of buffer areas may include data on applications that are distinguished from each other. Sizes of data stored in each of the plurality of buffer areas may be different from each other. For example, the sixth buffer area may include data corresponding to a total size of the sixth buffer area. That is, the sixth buffer area may be full of data. In addition, the first buffer area may include data of the smallest size. That is, the first buffer area may not be full.

In an embodiment, it is assumed that a request is received from the host to allocate a new buffer area other than the first to tenth buffer areas, and the power information provided by the host indicates a state in which additional auxiliary power may not be provided by the host to the memory controller if the main power become abnormal. The flush controller 213 of FIG. 4 may sense the state of the buffer memory 220 or perform the flush operation on the temporarily stored data according to the buffer state information stored in the state storage 212. The flush controller 213 may select the sixth buffer area including the most temporarily stored data among the first to tenth buffer areas as a target to perform the flush operation. Then the flush controller 213 may control the memory device 100 to store the data stored the sixth buffer area into a sixth memory area corresponding to the sixth buffer area in the memory device 100. For convenience of description, the first to tenth memory areas are illustrated as being sequentially arranged, but an order of the respective memory areas is not limited thereto.

FIG. 7 illustrates the operation of the flush controller following the operation of FIG. 6.

Referring to FIG. 7, the sixth buffer area may indicate a state in which temporarily stored data is stored in the sixth memory area; that is, sixth buffer area has been flushed to the sixth memory area. In an embodiment, the sixth buffer area may therefore no longer be an allocated buffer area. Accordingly, when the buffer allocation request is newly input from the host, the sixth buffer area may be allocated to store data again. At this time, the buffer allocation request may correspond to a memory area other than the sixth memory area. For example, when a buffer allocation request for an eleventh memory area (not shown) included in the memory device 100 is input, the sixth buffer area may be designated to temporarily store data to be stored in the eleventh memory area (memory). That is, the buffer areas do not respectively correspond to physically fixed memory areas but may each be dynamically linked with a respective memory area. Thus, when a buffer area is re-used after being flushed, either or both of a LA range and a PA range associated with the buffer area may be changed.

After the flush controller 213 performs the flush operation on the sixth memory area, the flush controller 213 may select the ninth buffer area having the most temporarily stored data among the remaining buffer areas as a target for the next flush operation. Then the flush controller 213 may control the memory device 100 to store the data in the ninth buffer area into a corresponding ninth memory area in the memory device 100. In an embodiment, the flush controller 213 performing the flush operation may include adding dummy data to the data temporarily stored in the ninth buffer area when the size of the write data received from the host and stored into the ninth buffer area is less than a size of the ninth buffer area. As described above, the ninth memory area and the sixth memory area may be distinguished from each other, and the data stored in each of the ninth memory area and the sixth memory area may be data related to different applications.

Figure 8:
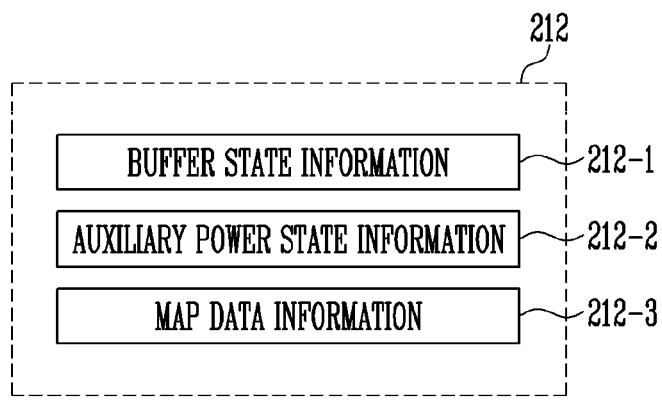
FIG. 8 illustrates a state storage of FIG. 4 according to an embodiment.

FIG. 8 is a diagram illustrating the state storage of FIG. 4 according to an embodiment.

Referring to FIG. 8, the state storage 212 may include buffer state information 212-1, auxiliary power state information 212-2, and map data information 212-3.

The buffer state information 212-1 may include information on the state of the buffer memory. A more detailed description of the buffer state information 212-1 will be described later with reference to FIG. 9.

The auxiliary power state information 212-2 may include information on the state of the auxiliary power device 300 shown in FIG. 1. The auxiliary power state information 212-2 may correspond to the reference value described with reference to FIG. 4. Furthermore, the auxiliary power state information 212-2 may include information on the auxiliary power cells included in the auxiliary power device 300. The auxiliary power cells may include normal auxiliary power cells and defective auxiliary power cells. The normal auxiliary power cells may refer to cells capable of providing the auxiliary power when the supply of the main power is abnormally cut off. The defective auxiliary power cells may refer to cells that are not capable of providing the auxiliary power when the supply of the main power is abnormally cut off.

The auxiliary power state information 212-2 may include at least one of information on the number of normal auxiliary power cells and information on the number of defective auxiliary power cells. In another embodiment, the auxiliary power state information 212-2 may include information on the amount of power that may be provided to the memory controller and the memory device from the storage auxiliary power device 300.

As a result of repeating charging and discharging of the auxiliary power cells included in the auxiliary power device 300, some auxiliary power cells may deteriorate and thus one or more defective auxiliary power cells may occur. As the number of defective auxiliary power cells increases, the amount of auxiliary power that may be supplied from the auxiliary power device 300 may decrease. When a change in which the number of defective auxiliary power cells increases or the amount of the auxiliary power that may be supplied from the auxiliary power device 300 decreases, information on the changed state of the auxiliary power device 300 may be stored in the state storage 212. The information on the changed state of the auxiliary power device 300 may be the reference value. In addition, when the buffer allocation request is received from the host, the buffer allocation manager may determine a subsequent operation based on the reference value, which is the auxiliary power state information 212-2 stored in the state storage 212, and the buffer state information 212-1 on the plurality of allocated buffer areas. That is, it may be determined whether to respond to the request from the host by allocating an additional buffer area or by performing the flush operation of storing some or all of the data temporarily stored in the allocated buffer areas into the memory device. That is, when the amount of power that may be supplied from the auxiliary power device 300 decreases, the reference value may also decrease accordingly. The decreased reference value may be compared with information on the plurality of allocated buffer areas (such as the number of allocated buffer areas or the amount of data stored or capable of being stored in the allocated buffer areas). When a value corresponding to the information on the plurality of allocated buffer areas is less than the decreased reference value, the additional buffer area may be allocated in response to the request of the host. When the value corresponding to the information on the plurality of allocated buffer areas is equal to or greater than the decreased reference value, the power information may be requested to the host.

The map data information 212-3 may include the mapping relationship of the physical address indicating the memory area in the memory device corresponding to the logical address received from the host.

FIG. 9 illustrates the buffer state information of FIG. 8.

Referring to FIG. 9, the buffer state information 212-1 may include information on the allocated buffer areas. Specifically, the buffer state information 212-1 may include a buffer area address, a zone identifier, and a stored data size for each allocated buffer area. The buffer area address may be an address indicating a position allocated to a corresponding buffer area in the buffer memory. The zone identifier may indicate the memory areas corresponding to the respective buffer areas. The stored data size may indicate the size or amount of the data stored in each buffer area.

For example, referring to FIG. 9, the number of allocated buffer areas may be eight. In addition, the sizes or amounts of the data stored in each of the buffer areas may be different from each other. An address of the first buffer area may be BFADD1. The size of data temporarily stored in the first buffer area may be 4 Kbytes. An address of the second buffer area may be BFADD2. The size of data temporarily stored in the second buffer area may be 2 Kbytes. The size of data temporarily stored in the third, fourth, fifth, sixth, seventh, and eighth buffer areas may be 1 Kbyte, 2 Kbyte, 2 Kbyte, 4 Kbyte, 2 Kbyte, and 1 Kbyte, respectively.

When the allocation request of the additional buffer area is input, the buffer allocation manager 211 described with reference to FIG. 4 may determine whether to allocate the additional buffer area based on the number of allocated buffer areas included in the buffer state information. In another embodiment, determining whether to allocate the additional buffer area may be based on size information of the data stored in the buffer areas included in the buffer state information.

Specifically, in an embodiment, the buffer allocation manager 211 may compare the reference value included in the auxiliary power state information 212-2 with the number of the plurality of allocated buffer areas. In another embodiment, the buffer allocation manager 211 may compare a value obtained by adding the number of the plurality of allocated buffer areas and the number of buffer areas requested by the host with the reference value.

In an embodiment, when the request for additionally allocating the new buffer area is received, the state of the storage auxiliary power device may be a state capable of guaranteeing that the data temporarily stored in the allocated buffer areas can be stored in the memory device using the power from the storage auxiliary power device. That is, the storage auxiliary power device may have the amount of power that may need to be provided to the memory device and the memory controller during the time when the data which is temporarily stored in the allocated buffer areas is stored in the memory device. In another embodiment, the number of allocated buffer areas may be less than the reference value, which is the number of buffer areas in which the auxiliary power device may guarantee completion of the flush operation, and therefore the buffer allocation manager 211 further allocates the buffer area in response to the request from the host.

In another embodiment, it may be the case that the auxiliary power device may not have enough stored energy to guarantee that the data which is temporarily stored in the plurality of buffer areas can be stored in the memory device when the request for allocating the additional new buffer area is input. That is, the reference value, which indicates the number of buffer areas that the auxiliary power device may guarantee the completion of the flush operation of, may be less than or equal to the number of allocated buffer areas. When this is the case, the buffer allocation manager 211 may provide to the host the delay response for delaying the allocation of the new buffer area.

Referring to FIGS. 4 and 9, although the buffer state information 212-1 is shown as being outside of the buffer memory 220, in various embodiments, the buffer state information 212-1 may be included in the buffer memory 220. That is, the buffer memory 220 may include a meta area including information on the plurality of buffer areas. The meta area may be a space in which the buffer state information 212-1 that is the information on the plurality of buffer areas is stored.

Figure 10:
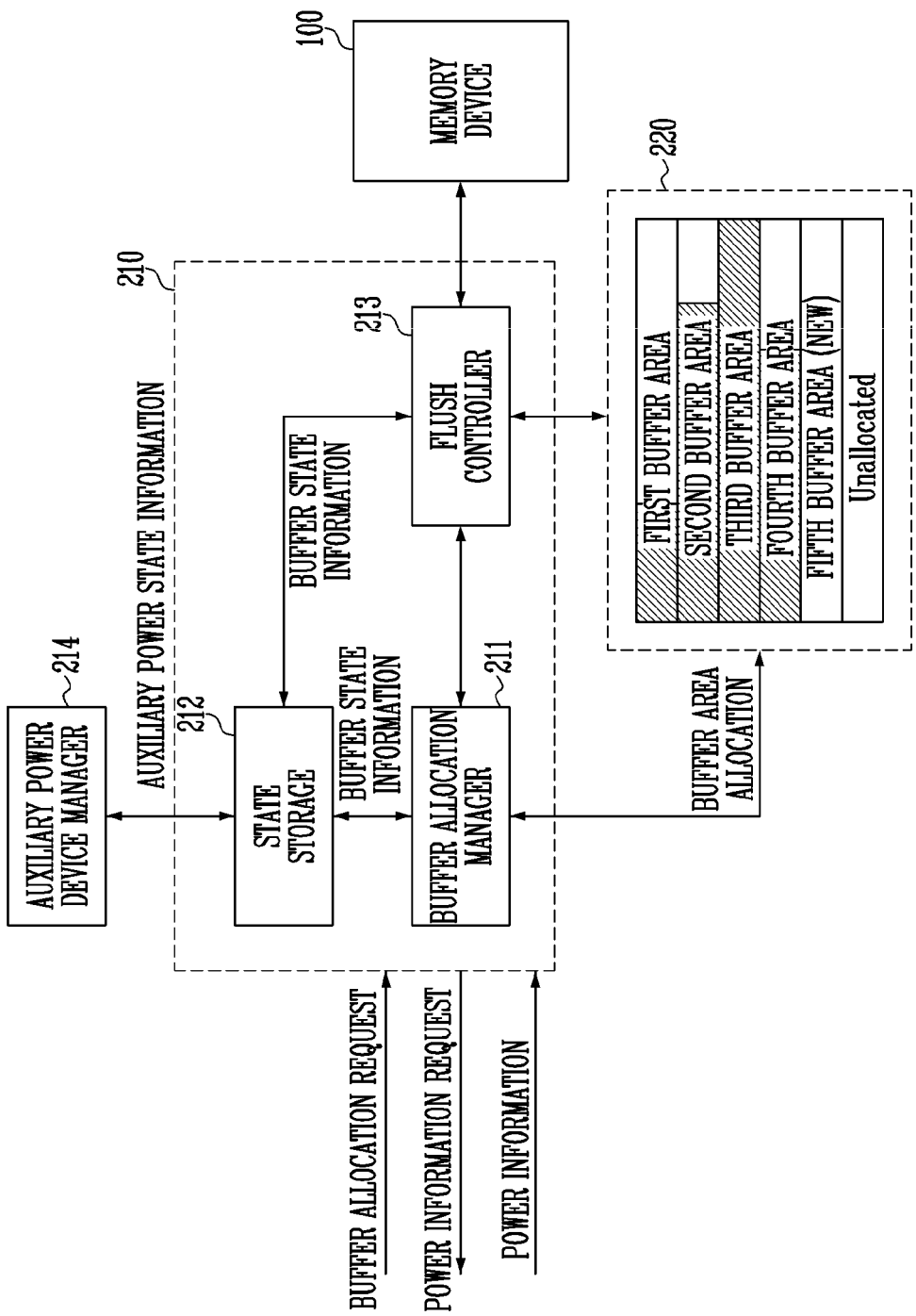
FIG. 10 illustrates an update of auxiliary power state information of FIG. 8 according to an embodiment.

FIG. 10 is a diagram for describing an update of the auxiliary power state information of FIG. 8.

Referring to FIG. 10, the memory controller may further include an auxiliary power device manager 214. The auxiliary power device manager 214 may sense the state of the auxiliary power device (such as the auxiliary power device 300 of FIG. 1) that supplies auxiliary power when the supply of the main power is abnormal. That is, the auxiliary power device manager 214 may monitor the state of the auxiliary power device. For example, when the size of the auxiliary power that may be provided from the auxiliary power device changes, the auxiliary power device manager 214 may monitor changed auxiliary power size or amount information and provide changed auxiliary power state information to the state storage 212. When some of the normal auxiliary power cells degrade into defective auxiliary power cells, the amount of the auxiliary power that may be supplied may be reduced. Information corresponding to the reduced auxiliary power amount may be stored in the state storage 212.

For example, the amount of auxiliary power that may be provided by the auxiliary power device may be reduced due to the increase of the number of defective auxiliary power cells. When the supply of the main power is abnormally cut off, the memory controller 200 needs the auxiliary power to control the memory device 100 so that the data which is temporarily stored in the plurality of buffer areas can be stored in the memory device 100. In an embodiment, when the size of the auxiliary power that may be provided is reduced due to the defective auxiliary power cell(s) in the auxiliary power device, the buffer allocation manager 211 may be required to allocate a smaller number of buffer areas than before. In another embodiment, the buffer allocation manager 211 may be required to manage the plurality of buffer areas so that the size of the data temporarily stored in the plurality of buffer areas is reduced. According to an embodiment, the auxiliary power state information stored in the state storage 212 may be updated by the auxiliary power device manager 214. In an embodiment, the updated auxiliary power state information may be compared with the number of allocated buffer areas by using the reference value described above. In another embodiment, the updated auxiliary power state information may be the reference value described with reference to FIG. 4 that is compared with the size of the data stored in the allocated buffer areas. Since components shown in FIG. 10 are substantially the same as the like-numbered components shown in FIG. 4 except for the auxiliary power device manager 214, repetitive descriptions are omitted.

Figure 11:
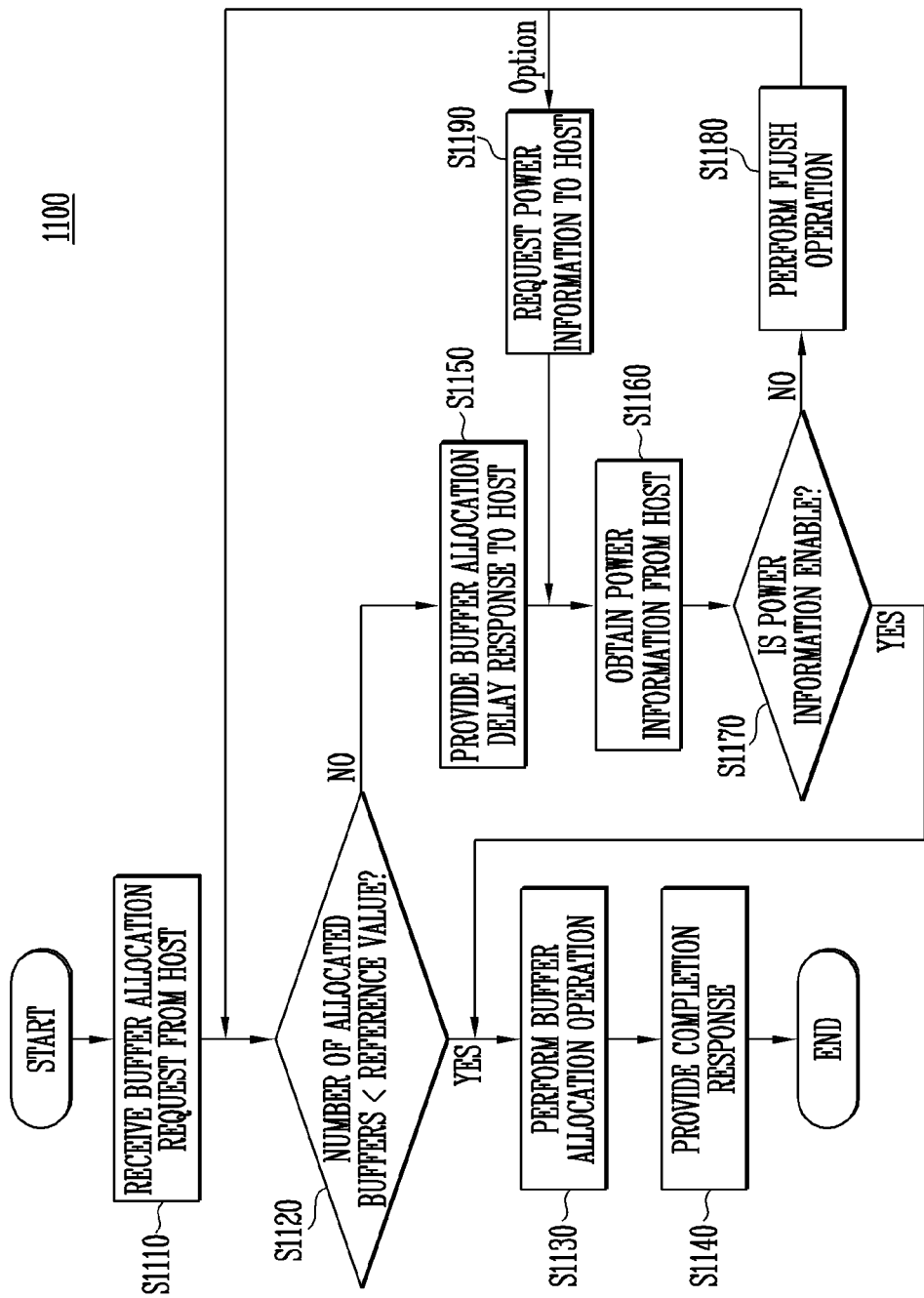
FIG. 11 illustrates a process of operating the buffer memory controller according to an embodiment.

FIG. 11 illustrates a process 1100 of operating the buffer memory controller according to an embodiment.

In step S1110, the buffer memory controller may receive a buffer allocation request from the host. The buffer allocation request may be the request for allocating the new buffer area different from the already-allocated buffer areas.

In step S1120, the buffer memory controller may compare the number of allocated buffers with the reference value. The buffer memory controller may include the state storage. The state storage may include information on the state of any allocated buffers and information indicating the state of the auxiliary power of a storage auxiliary power device included in the storage device. The information indicating the state of the auxiliary power may be a reference value related to guaranteeing that the data temporarily stored in the plurality of buffer areas can be stored in the memory device when the auxiliary power is supplied. The reference value may be determined according to the size (i.e., the energy storage capacity) of the storage auxiliary power device. When the size of the auxiliary power decreases or increases, the reference value may also decrease or increase in correspondence therewith. The changed reference value may be updated and stored in the state storage. In the embodiment of FIG. 11, when the number of currently allocated buffers is less than a number of buffers indicated by the reference value, the process 1100 may proceed to step S1130. When the number of currently allocated buffers is equal to or greater than the number of buffers indicated by the reference value, the process 1100 may proceed to step S1150.

In step S1130, a buffer allocation operation in which the new buffer area is allocated may be performed in response to the request of the host, and in step S1140 a completion response indicating that the buffer area has been allocated is sent to the host.

In step S1150, in response to the request from the host, the buffer memory controller may provide the delay response for delaying the new buffer allocation to the host. The delay response may indicate to the host 400 that the requested allocation a new buffer area was not performed.

In step S1160, the buffer memory controller may request the power information to the host. The power information may include the information on the amount of power that may be provided from the host to the memory controller when the main power is abnormally cut off. The host may provide the power information in response to the request.

In step S1170, the power information received from the host may include enable information indicating that the host is in a state in which the host may provide the amount of power to the memory controller, or disable information indicating that the host is in a state in which the host may not provide the amount of power to the memory controller. In another example, the power information may include information indicating that the amount of power that may be provided from the host is equal to or greater than a predetermined threshold value or information indicating that the amount of power that may be provided from the host is less than the predetermined threshold value. When the power information received from the host is the enable information or the information indicating that the amount of power that may be provided from the host is equal to or greater than the predetermined threshold value, the process 1100 may proceed to step S1130. When the power information received from the host is the disable information or the information indicating that the amount of power that may be provided from the host is less than the predetermined threshold value, the process 1100 may proceed to step S1180.

In step S1180, the buffer memory controller may perform the flush operation of storing data which is temporarily stored in at least one of the plurality of buffer areas into the memory device. In an embodiment, the buffer memory controller may perform the flush operation by preferentially selecting a buffer area of which the size of the stored data is large based on the respective sizes of the data stored in the plurality of buffer areas. After the flush operation is performed, the process 1100 may proceed to step S1120 where the number of buffer areas allocated is compared with the reference value again. In another embodiment, after the flush operation is performed, the process 1100 may proceed to step S1160 of requesting and receiving the power information from the host.

According to an embodiment, the number of buffer areas allocated may be determined not only according to the auxiliary power of the storage device, but also according to a power of the host, or the flush operation in which the data temporarily stored in the buffer is stored into the memory device may be performed. In this manner, the reliability of the storage device may be improved. For example, when a storage device receives a request to allocate a new buffer area that would increase the number of allocated buffer areas (or the size of the data stored in the allocated buffer areas) beyond the capacity of a storage auxiliary power device to guarantee the safety of if an unexpected cut off of main power occurs, then when the host indicates it can provide additional power if the unexpected cut off of main power occurs, the new buffer area may be allocated; otherwise, one or more of the allocated buffer areas are flushed before the new buffer area is allocated.

Figure 12:
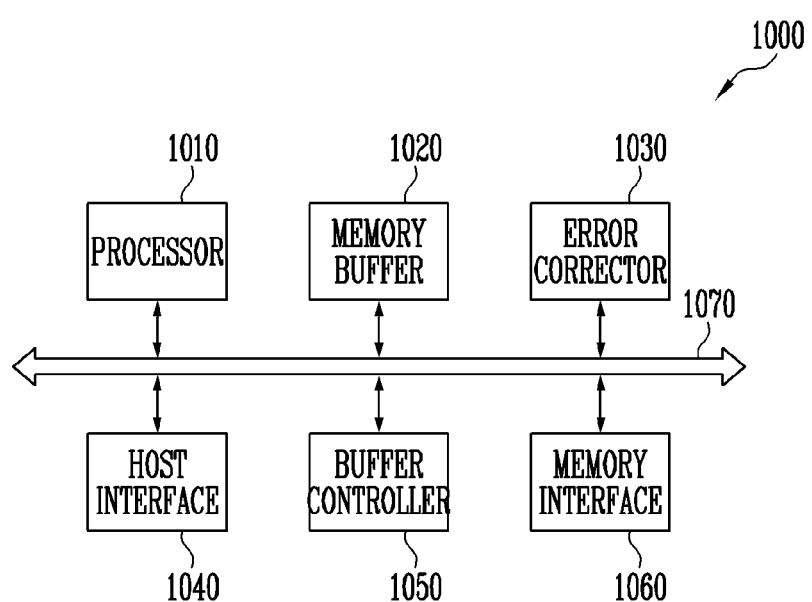
FIG. 12 illustrates another embodiment of the memory controller of FIG. 1.

FIG. 12 is a diagram for describing another embodiment of a memory controller such as shown in FIG. 1.

The memory controller 1000 is connected to a host and a memory device, as shown for the memory controller 200 of FIG. 1. The memory controller 1000 is configured to access the memory device in response to requests from the host.

Referring to FIG. 12, the memory controller 1000 may include a processor 1010, a memory buffer 1020, an error corrector (ECC) 1030, a host interface 1040, a buffer controller 1050, a memory interface 1060, and a bus 1070.

The bus 1070 may be configured to provide a channel between components of the memory controller 1000.

The processor 1010 may control overall operations of the memory controller 1000 and may perform a logical operation. The processor 1010 may communicate with an external host through the host interface 1040 and communicate with the memory device through the memory interface 1060. In addition, the processor 1010 may communicate with the memory buffer 1020 through the buffer controller 1050. The processor 1010 may control an operation of the storage device using the memory buffer 1020 as an operation memory, a cache memory, or a buffer memory.

The processor 1010 may perform a function of a flash translation layer (FTL). The processor 1010 is configured to randomize data received from the host. For example, the processor 1010 may randomize the data received from the host using a random seed. The randomized data is provided to the memory device as data to be stored and is programmed to the memory cell array.

The processor 1010 is configured to de-randomize data received from the memory device during the read operation. For example, the processor 1010 may de-randomize the data received from the memory device using a random seed. The de-randomized data may be output to the host.

As an embodiment, the processor 1010 may perform the randomization and the de-randomization by executing software or firmware.

The memory buffer 1020 may be used as an operation memory, a cache memory, or a buffer memory of the processor 1010. The memory buffer 1020 may store codes and commands executed by the processor 1010. The memory buffer 1020 may store data processed by the processor 1010. The memory buffer 1020 may include a static RAM (SRAM) or a dynamic RAM (DRAM).

The error corrector 1030 may perform error correction. The error corrector 1030 may perform error correction encoding (ECC encoding) based on data to be written to the memory device through memory interface 1060. The error correction encoded data may be transferred to the memory device through the memory interface 1060. The error corrector 1030 may perform error correction decoding (ECC decoding) on the data received from the memory device through the memory interface 1060. For example, the error corrector 1030 may be included in the memory interface 1060 as a component of the memory interface 1060.

The host interface 1040 is configured to communicate with an external host under control of the processor 1010. The host interface 1040 may be configured to perform communication using at least one of various communication methods such as a universal serial bus (USB), a serial AT attachment (SATA), a serial attached SCSI (SAS), a high speed interchip (HSIC), a small computer system interface (SCSI), a peripheral component interconnection (PCI express), a nonvolatile memory express (NVMe), a universal flash storage (UFS), a secure digital (SD), a multimedia card (MMC), an embedded MMC (eMMC), a dual in-line memory module (DIMM), a registered DIMM (RDIMM), and a load reduced DIMM (LRDIMM).

The buffer controller 1050 is configured to control the memory buffer 1020 under the control of the processor 1010.

The memory interface 1060 is configured to communicate with the memory device under the control of the processor 1010. The memory interface 1060 may communicate a command, an address, and data with the memory device through a channel.

For example, the memory controller 1000 may not include the memory buffer 1020 and the buffer controller 1050.

For example, the processor 1010 may control the operation of the memory controller 1000 using codes. The processor 1010 may load the codes from a non-volatile memory device (for example, a read only memory) provided inside the memory controller 1000. As another example, the processor 1010 may load the codes from the memory device through the memory interface 1060.

For example, the bus 1070 of the memory controller 1000 may be divided into a control bus and a data bus. The data bus may be configured to transmit data within the memory controller 1000 and the control bus may be configured to transmit control information such as a command and an address within the memory controller 1000. The data bus and the control bus may be separated from each other and may not interfere with each other or affect each other. The data bus may be connected to the host interface 1040, the buffer controller 1050, the error corrector 1030, and the memory interface 1060. The control bus may be connected to the host interface 1040, the processor 1010, the buffer controller 1050, the memory buffer 1020, and the memory interface 1060.

In an embodiment, the memory buffer 1020 of FIG. 12 may include the buffer memory 220 described with reference to FIGS. 1 to 4, 6, 7, and 10. The memory buffer 1020 of FIG. 12 may include the state storage 212 described with reference to FIG. 8.

Figure 13:
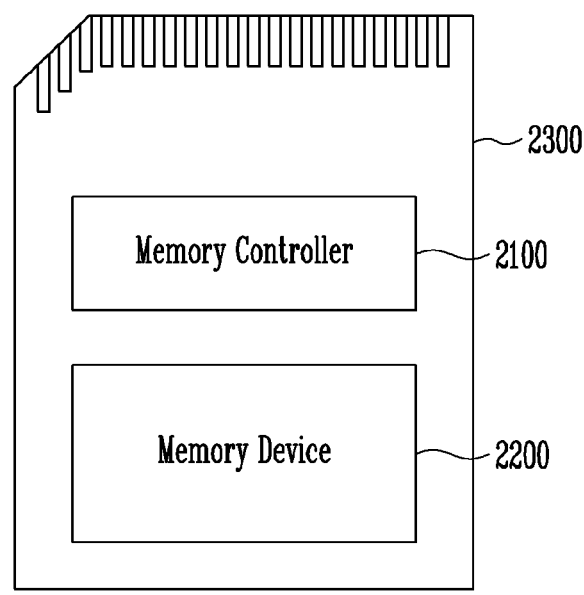
FIG. 13 illustrates a memory card system including a storage device according to an embodiment.

FIG. 13 is a block diagram illustrating a memory card system to which the storage device including the memory device according to an embodiment of the present disclosure is applied.

Referring to FIG. 13, the memory card system 2000 includes a memory controller 2100, a memory device 2200, and a connector 2300.

The memory controller 2100 is connected to the memory device 2200. The memory controller 2100 is configured to access the memory device 2200. The memory controller 2100 may be implemented as described for the memory controller 200 described with reference to FIG. 1 or as described for the memory controller 1000 of FIG. 12.

For example, the memory controller 2100 may include components such as a random access memory (RAM), a processor, a host interface, a memory interface, and an error corrector.

The memory controller 2100 may communicate with an external device through the connector 2300. The memory controller 2100 may communicate with an external device (for example, the host) according to a specific communication standard. For example, the memory controller 2100 is configured to communicate with an external device through at least one of various communication standards such as a universal serial bus (USB), a multimedia card (MMC), an embedded MMC (MCM), a peripheral component interconnection (PCI), a PCI express (PCI-E), an advanced technology attachment (ATA), a serial-ATA, a parallel-ATA, a small computer system interface (SCSI), an enhanced small disk interface (ESDI), integrated drive electronics (IDE), Fire-Wire, a universal flash storage (UFS), Wi-Fi, Bluetooth, and an NVMe. For example, the connector 2300 may be defined by at least one of the various communication standards described above.

For example, the memory device 2200 may be implemented as various non-volatile memory elements such as an electrically erasable and programmable ROM (EEPROM), a NAND flash memory, a NOR flash memory, a phase-change RAM (PRAM), a resistive RAM (ReRAM), a ferroelectric RAM (FRAM), and a spin-torque magnetic RAM (STT-MRAM).

For example, the memory controller 2100 or the memory device 2200 may be packaged and provided as one semiconductor package using technology such as a package on package (PoP), ball grid arrays (BGAs), chip scale packages (CSPs), plastic leaded chip carriers (PLCC), a plastic dual in line package (PDIP), a die in waffle pack, die in wafer form, a chip on board (COB), a ceramic dual in line package (CERDIP), a plastic metric quad flat pack (MQFP), a small outline (SOIC), a shrink small outline package (SSOP), a thin small outline (TSOP), a thin quad flat pack (TQFP), a system in package (SIP), a multi-chip package (MCP), a wafer-level fabricated package (WFP), or a wafer-level stack package (WSP). Alternatively, the memory device 2200 may include a plurality of non-volatile memory chips, and the plurality of non-volatile memory chips may be packaged and provided as one semiconductor package based on the above-described package technologies.

For example, the memory controller 2100 and the memory device 2200 may be integrated into one semiconductor device. For example, the memory controller 2100 and the memory device 2200 may be integrated into one semiconductor device to configure a solid state drive (SSD). The memory controller 2100 and the memory device 2200 may be integrated into one semiconductor device to configure a memory card. For example, the memory controller 2100 and the memory device 2200 may be integrated into one semiconductor device to configure a memory card such as a PC card (personal computer memory card international association (PCMCIA)), a compact flash card (CF), a smart media card (SM or SMC), a memory stick, a multimedia card (MMC, RS-MMC, MMCmicro, or eMMC), an SD card (SD, miniSD, microSD, or SDHC), and a universal flash storage (UFS).

For example, the memory device 2200 may be the memory device 100 described with reference to FIG. 1.

Figure 14:
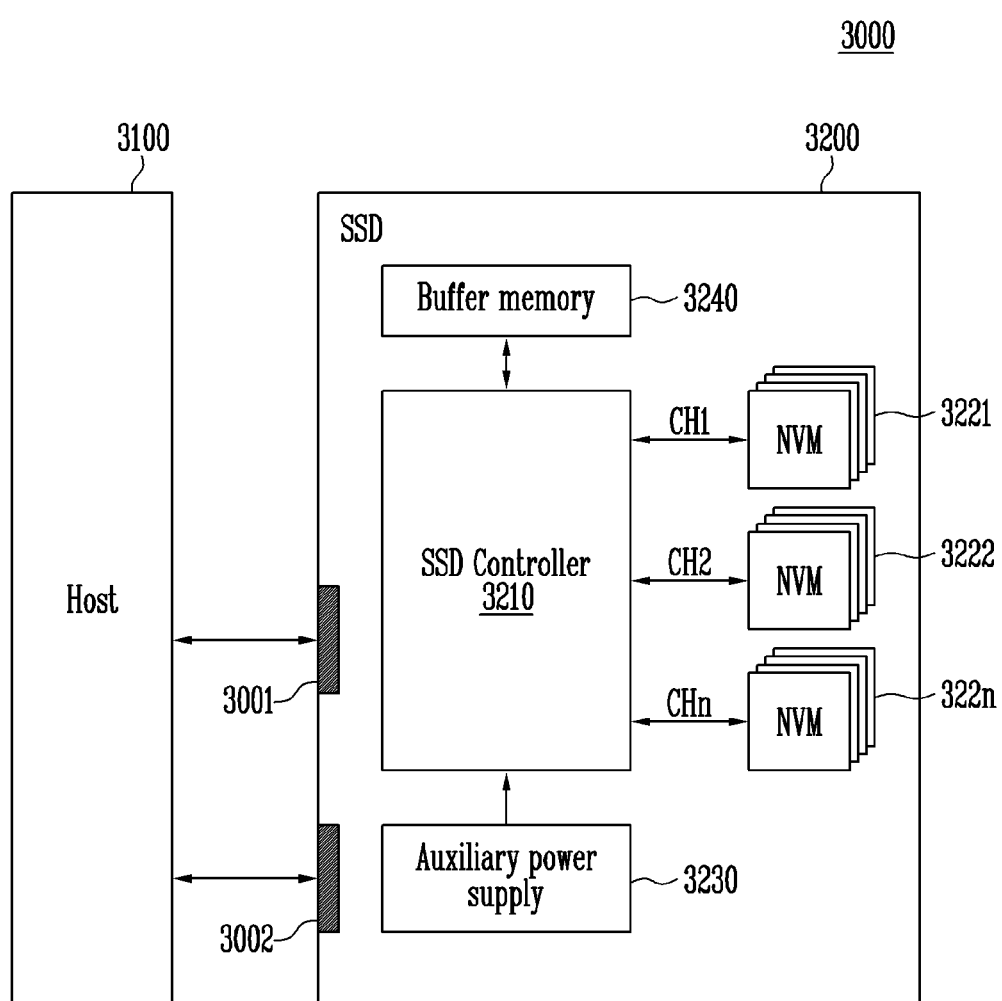
FIG. 14 illustrates a solid state drive (SSD) system including a storage device according to an embodiment.

FIG. 14 is a block diagram illustrating a solid state drive (SSD) system to which the storage device including the memory controller according to an embodiment of the present disclosure is applied.

Referring to FIG. 14, the SSD system 3000 includes a host 3100 and an SSD 3200. The SSD 3200 exchanges a signal SIG with the host 3100 through a signal connector 3001 and receives power PWR through a power connector 3002. The SSD 3200 includes an SSD controller 3210, a plurality of flash memories 3221 to 322n, an auxiliary power device 3230, and a buffer memory 3240.

In an embodiment, the SSD controller 3210 may perform the function of the memory controller 200 described with reference to FIG. 1.

The SSD controller 3210 may control the plurality of flash memories 3221 to 322n in response to the signal SIG received from the host 3100. For example, the signal SIG may be signals based on an interface between the host 3100 and the SSD 3200. For example, the signal SIG may be a signal defined by at least one of interfaces such as a universal serial bus (USB), a multimedia card (MMC), an embedded MMC (MCM), a peripheral component interconnection (PCI), a PCI express (PCI-E), an advanced technology attachment (ATA), a serial-ATA, a parallel-ATA, a small computer system interface (SCSI), an enhanced small disk interface (ESDI), integrated drive electronics (IDE), Fire-Wire, a universal flash storage (UFS), Wi-Fi, Bluetooth, and an NVMe.

The auxiliary power device 3230 is connected to the host 3100 through the power connector 3002. The auxiliary power device 3230 may receive the power PWR from the host 3100 and may charge using that power. The auxiliary power device 3230 may operate as a storage auxiliary power device to provide power of the SSD 3200 when a power supply from the host 3100 is abnormal. For example, the auxiliary power device 3230 may be positioned in the SSD 3200 or may be positioned outside the SSD 3200. For example, the auxiliary power device 3230 may be positioned on a main board and may provide auxiliary power to the SSD 3200. For example, the auxiliary power device 3230 of FIG. 14 may be the auxiliary power device 300 described with reference to FIG. 1.

The buffer memory 3240 operates as a buffer memory of the SSD 3200. For example, the buffer memory 3240 may temporarily store data received from the host 3100 or data received from the plurality of flash memories 3221 to 322n, or may temporarily store metadata (for example, a mapping table) of the flash memories 3221 to 322n. The buffer memory 3240 may include a volatile memory such as a DRAM, an SDRAM, a DDR SDRAM, an LPDDR SDRAM, and a GRAM, or a non-volatile memory such as an FRAM, a ReRAM, an STT-MRAM, and a PRAM.

For example, the non-volatile memories 3321 to 322n may be the memory device 100 described with reference to FIG. 2. In an embodiment, the buffer memory 3240 of FIG. 14 may include the buffer memory 220 described with reference to FIGS. 1 to 4, 6, 7, and 10. The buffer memory 3240 of FIG. 14 may include the state storage 212 described with reference to FIG. 8.

Figure 15:
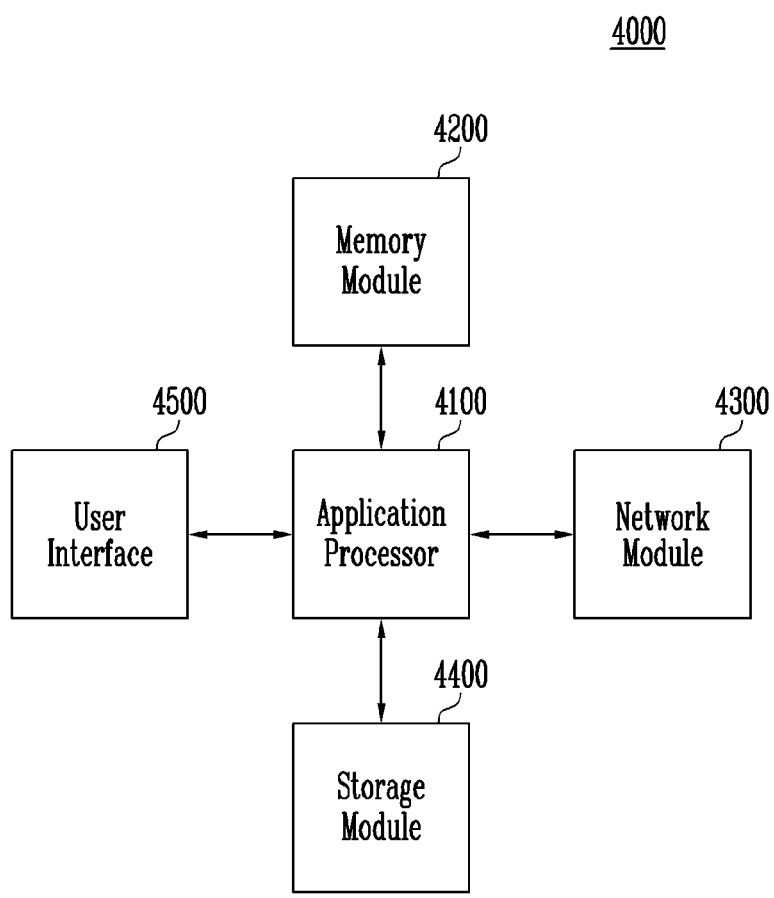
FIG. 15 illustrates a user system including a storage device according to an embodiment.

FIG. 15 is a block diagram illustrating a user system to which the storage device including the memory controller according to an embodiment of the present disclosure is applied.

Referring to FIG. 15, the user system 4000 includes an application processor 4100, a memory module 4200, a network module 4300, a storage module 4400, and a user interface 4500.

The application processor 4100 may drive components, an operating system (OS), a user program, or the like included in the user system 4000. For example, the application processor 4100 may include controllers, interfaces, graphics engines, and the like that control the components included in the user system 4000. The application processor 4100 may be provided as a system-on-chip (SoC).

The memory module 4200 may operate as a main memory, an operation memory, a buffer memory, or a cache memory of the user system 4000. The memory module 4200 may include a volatile random access memory such as a DRAM, an SDRAM, a DDR SDRAM, a DDR2 SDRAM, a DDR3 SDRAM, an LPDDR SDARM, an LPDDR2 SDRAM, and an LPDDR3 SDRAM, or a non-volatile random access memory, such as a PRAM, a ReRAM, an MRAM, and an FRAM. For example, the application processor 4100 and memory module 4200 may be packaged based on a package on package (POP) and provided as one semiconductor package.

The network module 4300 may communicate with external devices. For example, the network module 4300 may support wireless communication such as code division multiple access (CDMA), global system for mobile communications (GSM), wideband CDMA (WCDMA), CDMA-2000, time division multiple access (TDMA), long term evolution, Wimax, WLAN, UWB, Bluetooth, and WI-FI. For example, the network module 4300 may be included in the application processor 4100.

The storage module 4400 may store data. For example, the storage module 4400 may store data received from the application processor 4100. Alternatively, the storage module 4400 may transmit data stored in the storage module 4400 to the application processor 4100. For example, the storage module 4400 may be implemented as a non-volatile semiconductor memory element such as a phase-change RAM (PRAM), a magnetic RAM (MRAM), a resistive RAM (RRAM), a NAND flash, a NOR flash, and a three-dimensional NAND flash. For example, the storage module 4400 may be provided as a removable storage device (removable drive), such as a memory card, and an external drive of the user system 4000.

For example, the storage module 4400 may include a memory controller according to an embodiment and a plurality of non-volatile memory devices, the memory controller may be the memory controller 200 described above, and the plurality of non-volatile memory devices may be the memory device 100 described with reference to FIG. 1.

The user interface 4500 may include interfaces for inputting data or an instruction to the application processor 4100 or for outputting data to an external device. For example, the user interface 4500 may include user input interfaces such as a keyboard, a keypad, a button, a touch panel, a touch screen, a touch pad, a touch ball, a camera, a microphone, a gyroscope sensor, a vibration sensor, and a piezoelectric element. The user interface 4500 may include user output interfaces such as a liquid crystal display (LCD), an organic light emitting diode (OLED) display device, an active matrix OLED (AMOLED) display device, an LED, a speaker, and a motor.

What is claimed is:

1. A memory controller that controls an operation of a memory device including a plurality of memory areas, the memory controller comprising:
   a buffer memory configured to store data in an allocated buffer area among a plurality of buffer areas; and
   a buffer memory controller configured to control the buffer memory and the memory device to store the data stored in the allocated buffer area and dummy data into the memory device, based on information on power to be provided from a host to the memory controller when supply of main power provided to the memory controller is cut off.

2. The memory controller of claim 1, wherein the buffer memory controller comprises:
   a state storage configured to store buffer state information on a state of the allocated buffer area; and
   a flush controller configured to control the buffer memory and the memory device to store the data stored in the allocated buffer area and the dummy data into the memory device, based on the buffer state information, in response to the information that an amount of the power is less than a threshold value.

3. The memory controller of claim 1, wherein the buffer memory controller allocates a new buffer area among the plurality of buffer areas in response to the information that an amount of the power is equal to or greater than a threshold value.

4. The memory controller of claim 2, wherein the threshold value is determined according to an amount of power required to store the data.

5. The memory controller of claim 2, wherein the buffer state information includes information on a size of the data stored in the allocated buffer area.

6. The memory controller of claim 5, wherein the allocated buffer area is a buffer area which stores the data having a largest size from among data stored in each of the plurality of buffer areas.

7. A memory controller that controls an operation of a memory device including a plurality of memory areas, the memory controller comprising:
   a buffer memory configured to store data in an allocated buffer area among a plurality of buffer areas; and
   a buffer memory controller configured to:
      control the buffer memory and the memory device to store the data stored in the allocated buffer area into the memory device, based on power information on power to be provided from a host to the memory controller when supply of main power provided to the memory controller is cut off, and request new power information from the host after the data is stored in the memory device.

8. The memory controller of claim 7, wherein the buffer memory controller comprises:

a state storage configured to store buffer state information on a state of the allocated buffer area; and a flush controller configured to control the buffer memory and the memory device to store the data stored in the allocated buffer area into the memory device, based on the buffer state information, in response to the power information or the new power information that an amount of the power is less than a threshold value.

9. The memory controller of claim 7, wherein the buffer memory controller allocates a new buffer area among the plurality of buffer areas in response to the power information or the new power information that an amount of the power is equal to or greater than a threshold value.

10. The memory controller of claim 8, wherein the threshold value is determined according to an amount of power required to store the data.

11. The memory controller of claim 8, wherein the buffer state information includes information on a size of the data stored in the allocated buffer area.

12. The memory controller of claim 11, wherein the allocated buffer area is a buffer area which stores the data having a largest size from among data stored in each of the plurality of buffer areas.

13. A memory controller that controls an operation of a memory device including a plurality of memory areas, the memory controller comprising:

a buffer memory configured to store data in an allocated buffer area among a plurality of buffer areas; and a buffer memory controller configured to:

provide to the host a delay response for delaying allocation of a new buffer area, based on buffer state information on a state of allocated buffer areas among the plurality of buffer areas, and control the buffer memory and the memory device to store the data stored in the allocated buffer area into the memory device, based on information on power to be provided from a host to the memory controller when supply of main power provided to the memory controller is cut off.

14. The memory controller of claim 13, wherein the buffer memory controller comprises a state storage configured to store the buffer state information, and wherein the buffer memory controller provides to the host the delay response, when the buffer state information indicates that a number of the allocated buffer areas is less than a reference value.

15. The memory controller of claim 14, wherein the buffer memory controller comprises:

a flush controller configured to control the buffer memory and the memory device to store the data stored in the allocated buffer area into the memory device, in response to the information that an amount of the power is less than a threshold value.

16. The memory controller of claim 14, wherein the buffer memory controller allocates the new buffer area among the plurality of buffer areas, when the buffer state information indicates that the number of the allocated buffer areas is equal to or greater than the reference value, and the information indicates that an amount of the power is equal to or greater than a threshold value.

17. The memory controller of claim 13, wherein the buffer state information includes information on a size of data stored in each of the allocated buffer areas, and wherein the allocated buffer area is a buffer area which stores the data having a largest size from among the data stored in each of the allocated buffer areas.

* * * * *